United States Patent
Chen

(10) Patent No.: US 12,393,436 B2
(45) Date of Patent: Aug. 19, 2025

(54) METHOD FOR DEPLOYING VIRTUAL MACHINE AND CONTAINER, AND RELATED APPARATUS

(71) Applicant: HUAWEI TECHNOLOGIES CO., LTD., Shenzhen (CN)

(72) Inventor: Xueliang Chen, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 716 days.

(21) Appl. No.: 17/481,549

(22) Filed: Sep. 22, 2021

(65) Prior Publication Data
US 2022/0004410 A1 Jan. 6, 2022

Related U.S. Application Data

(63) Continuation of application No. PCT/CN2020/080505, filed on Mar. 20, 2020.

(30) Foreign Application Priority Data

Mar. 22, 2019 (CN) .......................... 201910224223.9

(51) Int. Cl.
*G06F 9/455* (2018.01)
*G06F 8/60* (2018.01)
*H04W 4/50* (2018.01)

(52) U.S. Cl.
CPC ............ *G06F 9/45533* (2013.01); *G06F 8/60* (2013.01); *H04W 4/50* (2018.02)

(58) Field of Classification Search
CPC .. G06F 9/45533; G06F 8/60; G06F 2209/503; G06F 9/5027; G06F 8/63; G06F 9/45558; G06F 2009/45562; H04W 4/50
See application file for complete search history.

(56) References Cited

U.S. PATENT DOCUMENTS

2018/0025160 A1    1/2018  Hwang et al.
2018/0131557 A1*   5/2018  Chou .................... H04L 41/044
(Continued)

FOREIGN PATENT DOCUMENTS

CN    105975330 A    9/2016
CN    107766050 A    3/2018
(Continued)

OTHER PUBLICATIONS

ETSI GS MEC 003 V1.1.1 (Mar. 2016), Mobile Edge Computing (MEC); Framework and Reference Architecture, Total 18 Pages.
(Continued)

*Primary Examiner* — Sisley N Kim
(74) *Attorney, Agent, or Firm* — Rimon PC

(57) ABSTRACT

Embodiments of this application disclose a method for deploying a virtual machine (VM) and a container to implement both container deployment and VM deployment in a multi-access edge computing (MEC) system. In the method, a unified orchestration function entity receives a deployment request, and determines that a deployment manner of an application is the container deployment or the VM deployment If the deployment manner of the application is the container deployment, a first resource allocation request is sent to an architecture manager, to request the architecture manager to deploy a container that can run an instance of the application. If the deployment manner of the application is the VM deployment, a resource allocation request is sent to a VIM, to request the VIM to deploy a VM that can run the instance of the application.

14 Claims, 13 Drawing Sheets

(56) References Cited

U.S. PATENT DOCUMENTS

| | | | | |
|---|---|---|---|---|
| 2018/0365076 A1* | 12/2018 | Liu | ...................... | G06F 9/45558 |
| 2019/0034244 A1* | 1/2019 | Yang | ...................... | G06F 9/5077 |
| 2019/0042319 A1 | 2/2019 | Sood et al. | | |
| 2019/0138934 A1* | 5/2019 | Prakash | .................. | G06V 10/95 |
| 2021/0117241 A1* | 4/2021 | Xia | ...................... | G06F 9/45558 |
| 2022/0075666 A1* | 3/2022 | Xia | ........................ | H04L 67/51 |

FOREIGN PATENT DOCUMENTS

| | | | |
|---|---|---|---|
| CN | 108205461 A | | 6/2018 |
| CN | 108399094 A | | 8/2018 |
| CN | 108418705 A | | 8/2018 |
| CN | 109358967 A | | 2/2019 |
| CN | 110569101 | * | 12/2019 |
| CN | 107431696 B | | 4/2020 |
| WO | 2018224243 A1 | | 12/2018 |

OTHER PUBLICATIONS

Huazhang Lv et al., "Deployment of Edge-Computing in 5G NFV Environment and Future Service-Based Architecture," 2018 IEEE 4th International Conference on Computer and Communications (ICCC), Dec. 10, 2018; 6 total pages.

Giuseppe A. Carella et al., "Prototyping NFV-based Multi-access Edge Computing in 5G ready Networks with Open Baton," 2017 IEEE Conference on Network Softwarization (NetSoft), Jul. 7, 2017; 4 total pages.

* cited by examiner

METHOD FOR DEPLOYING VIRTUAL MACHINE AND CONTAINER, AND RELATED APPARATUS

CROSS-REFERENCE TO RELATED APPLICATIONS

This application is a continuation of International Application No. PCT/CN2020/080505, filed on Mar. 20, 2020. The International Application claims priority to Chinese Patent Application No. 201910224223.9, filed on Mar. 22, 2019. The afore-mentioned patent applications are hereby incorporated by reference in their entireties.

TECHNICAL FIELD

Embodiments of this application relate to the field of computer technologies, and in particular, to a method for deploying a virtual machine and a container, and an apparatus.

BACKGROUND

With the development of computer technologies and communications technologies, multi-access edge computing (MEC) has become a key technology of the 5th generation (5G) mobile network. A MEC system is generally located at an edge of a network. Most service data sent by a user may be filtered and processed by the MEC system before being uploaded to a cloud to improve data processing speed and transmission reliability.

Currently, in the MEC system, an instance of an application is deployed only in a virtual machine (VM) deployment manner. However, with development of the communications technologies, the hybrid deployment of a VM and a container in the MEC system-becomes a requirement. In a hybrid deployment, an instance of an application is deployed in a container deployment manner or a VM deployment manner.

In the conventional technology, Kubernetes is a popular container management platform and is applicable to most container deployment. However, because resources of an edge node in the MEC system are limited and cannot meet resource usage requirement of Kubernetes on the edge node, Kubernetes is not suitable for container deployment in the MEC system.

SUMMARY

Embodiments of this application provide a method for deploying a virtual machine and a container, and an apparatus, to deploy a VM and a container in a MEC system.

To achieve the foregoing objective, the following technical solutions are used in the embodiments of this application.

According to a first aspect, an embodiment of this application provides a method and apparatus for deploying a virtual machine and a container. The method includes: A unified orchestration function entity receives a deployment request that is used to request to deploy an instance of an application, where the deployment request includes an identifier (ID) and orchestration information of the application, and the orchestration information is used to indicate resources required for running the instance of the application; and the unified orchestration function entity determines that a deployment manner of the application is container deployment or virtual machine VM deployment based on the deployment request, so that the unified orchestration function entity requests, based on the determined deployment manner, a virtualized infrastructure manager (VIM) or a container infrastructure manager (CIM) to deploy a VM or a container that is able to run the instance of the application.

According to the method in the first aspect, after receiving an application deployment request, the unified orchestration function entity may analyze and process the received deployment request, and determine, based on content included in the deployment request, a deployment manner (container deployment or VM deployment) of deploying the instance of the application, so that the unified orchestration function entity sends a resource allocation request to the VIM or the CIM based on the determined deployment manner, and requests resources required for deploying the application in a container deployment manner; or sends a resource allocation request to the VIM, and requests resources required for deploying the application in a VM deployment manner, to implement VM deployment of the application. In this way, both the VM deployment and the container deployment can be implemented in a MEC system.

In a first possible design, with reference to the first aspect, the method further includes: If the deployment manner of the application is the container deployment, the unified orchestration function entity sends, to an architecture manager, a first resource allocation request that is used to request resources required for deploying a container that can run the instance of the application; or if the deployment manner of the application is the VM deployment, the unified orchestration function entity sends, to the VIM, a second resource allocation request that is used to request resources required for deploying a VM that can run the instance of the application.

Based on the possible design, during container deployment, the first resource allocation request may be sent to the architecture manager, to request the architecture manager to allocate a container resource that can run the instance of the application, or during VM deployment, the second resource allocation request may be sent to the VIM, to request the VIM to allocate a VM resource that can run the instance of the application. In this way, both the container deployment and the VM deployment can be implemented.

In a second possible design, with reference to the first aspect or the first possible design of the first aspect, a correspondence exists between the ID of the application and the deployment manner of the application, and that the unified orchestration function entity determines the deployment manner of the application based on the deployment request includes: The unified orchestration function entity determines the deployment manner of the application based on the ID of the application and the correspondence. Based on the possible design, an ID used to identify the application may be corresponding to the deployment manner of the application, and the deployment manner of the application may be determined according to the correspondence. This is simple and easy to implement.

In a third possible design, with reference to the first aspect or the first possible design of the first aspect, the deployment request further includes a deployment type identifier, the deployment type identifier is used to identify the deployment manner of the application, and that the unified orchestration function entity determines the deployment manner of the application based on the deployment request includes: The unified orchestration function entity determines the deployment manner of the application based on the deployment type identifier. Based on the possible design, a deployment type identifier used to identify the deployment manner of the application may be added to the orchestration information, and the deployment manner of the application is explicitly indicated by using the deployment type identifier. This is simple and easy to implement.

It should be noted that the deployment type identifier may be included in a newly added information element in the deployment request, or may be included in the orchestration information included in the deployment request. This is not limited.

In a fourth possible design, with reference to any one of the first possible design of the first aspect to the third possible design of the first aspect, the method further includes: The unified orchestration function entity receives a first resource allocation response from the architecture manager. Based on the possible design, after a container resource is allocated, the first resource allocation response may be returned to the unified orchestration function entity, so that the unified orchestration function entity learns that the container resource has been successfully allocated to the instance of the application.

In a fifth possible design, with reference to any one of the first possible design of the first aspect to the third possible design of the first aspect, the method further includes: The unified orchestration function entity receives a second resource allocation response from the VIM. Based on the possible design, after a VM resource is allocated, the second resource allocation response may be returned to the unified orchestration function entity, so that the unified orchestration function entity learns that the VM resource has been successfully allocated to the instance of the application.

In a sixth possible design, with reference to the first aspect or any possible design of the first aspect, the method further includes: The unified orchestration function entity sends a configuration request to a MEP. The configuration request is used to request the MEP to configure a traffic rule and a DNS rule that are followed for running the application. Based on this possible design, some rules that are followed for running the instance of the application may be requested from the MEP, so that the instance of the application is run according to rules configured by the MEP.

In a seventh possible design, with reference to the first aspect or any possible design of the first aspect, the method further includes: The unified orchestration function entity sends a response of the deployment request. The response of the deployment request is used to indicate that the instance of the application is successfully deployed, and the response of the deployment request includes the ID of the application. Based on this possible design, after the instance of the application is successfully deployed, the response of the deployment request may be sent to a requester requesting to deploy the instance of the application, so that the requester learns that the instance of the application is successfully deployed.

In an eighth possible design, with reference to the first aspect or any possible design of the first aspect, the method further includes: The unified orchestration function entity receives a termination request. The termination request includes the ID of the application, and the termination request is used to terminate the instance of the application. If the deployment manner of the application is the container deployment, the unified orchestration function entity sends a first resource deletion request to the architecture manager. The first resource deletion request may be used to request the architecture manager to delete resources occupied by the instance of the application. Alternatively, if the deployment manner of the application is the VM deployment, the unified orchestration function entity sends a second resource deletion request to the VIM. The second resource deletion request may be used to request the VIM to delete resources occupied by the instance of the application. Based on the possible design, after receiving the termination request for terminating the instance of the application, the unified orchestration function entity may perform corresponding termination processing based on the deployment manner of the application. For example, if the deployment manner is the container deployment, the first resource deletion request is sent to the architecture manager, to request the architecture manager to delete the resources occupied by the instance of the application; or if the deployment manner is the VM deployment, the second resource deletion request is sent to the VIM, to request the VIM to delete the resources occupied by the instance of the application. In this way, in a case in which the instance of the application is not required, the architecture manager or the VIM may be requested to delete the instance of the application.

In a ninth possible design, with reference to the first aspect or any possible design of the first aspect, the unified orchestration function entity is an MEPM or a MEO. Based on the possible design, the MEPM or the MEO may perform the VM and container deployment method provided in this embodiment of this application, thereby improving execution flexibility.

In a tenth possible design, with reference to the first aspect or any possible design of the first aspect, the architecture manager is the VIM or the CIM. Based on the possible design, an existing function entity, for example, the VIM, may perform a container deployment function in this embodiment of this application, or a newly added function entity CIM may execute a container deployment process provided in this embodiment of this application.

According to a second aspect, this application provides a communications apparatus. The communications apparatus may be a unified orchestration function entity or a chip or a system on chip in a unified orchestration function entity. The unified orchestration function entity is an MEPM or a MEO, and may implement the function in the foregoing aspect or the possible designs implemented by the unified orchestration function entity. The function may be implemented by hardware, or may be implemented by hardware executing corresponding software. The hardware or the software includes one or more modules corresponding to the functions. For example, the communications apparatus may include a unified orchestration and scheduling management module.

The unified orchestration and scheduling management module is configured to: receive a deployment request, and determine a deployment manner of an application based on the deployment request. The deployment request is used to request to deploy an instance of the application, the deployment request includes an identifier ID and orchestration information of the application, the orchestration information is used to indicate resources required for deploying the instance of the application, and the deployment manner of the application includes container deployment or virtual machine VM deployment.

Further, the unified orchestration function entity further includes:

a container orchestration management module, configured to: if the unified orchestration and scheduling management module determines that the deployment manner of the application is the container deployment, send a first resource allocation request to an architecture manager, where the first resource allocation request is used to request resources required for deploying a container that can run the instance of the application; and a virtual machine VM scheduling management module, configured to: if the unified orchestration and scheduling management module determines that the deployment manner of the application is the VM deployment, send a second resource allocation request to a virtualized infrastructure manager VIM, where the second resource allocation request is used to request resources required for deploying a VM that can run the instance of the application.

For a specific implementation of the communications apparatus, refer to the behavior functions of the unified orchestration function entity in the method for deploying a virtual machine and a container provided in any one of the first aspect or the possible designs of the first aspect. Details are not described herein again. Therefore, the provided communications apparatus can achieve same beneficial effects as any one of the first aspect or the possible designs of the first aspect.

According to a third aspect, a communications apparatus is provided. The communications apparatus includes a processor and a memory. The memory is configured to store computer-executable instructions. When the communications apparatus runs, the processor executes the computer-executable instructions stored in the memory, to enable the communications apparatus to perform the method for deploying a virtual machine and a container according to any one of the first aspect or the possible designs of the first aspect.

According to a fourth aspect, a computer-readable storage medium is provided, where the computer-readable storage medium is a non-volatile readable storage medium. The computer-readable storage medium stores instructions, and when the instructions are run on a computer, the computer is enabled to perform the method for deploying a virtual machine and a container according to any one of the first aspect or the possible designs of the foregoing aspects.

According to a fifth aspect, a computer program product including instructions is provided. When the computer program product is run on a computer, the computer is enabled to perform the method for deploying a virtual machine and a container according to the first aspect or the possible designs of the foregoing aspects.

According to a sixth aspect, a chip system is provided. The chip system includes a processor and a communications interface, configured to support the chip system in implementing the functions in the foregoing aspects. For example, the processor receives a deployment request through the communications interface, and determines a deployment manner of an application based on the deployment request. The deployment request is used to request to deploy an instance of the application, the deployment request includes an identifier ID and orchestration information of the application, the orchestration information is used to indicate resources required for deploying the instance of the application, and the deployment manner of the application includes container deployment or virtual machine VM deployment. In a possible design, the chip system further includes a memory, and the memory is configured to store program instructions and data that are necessary for the communications apparatus. The chip system may include a chip, or may include a chip and another discrete component.

For technical effects achieved by any one of the design manners of the third aspect to the sixth aspect, refer to technical effects achieved by any one of the first aspect or the possible designs of the first aspect. Details are not described again.

According to a seventh aspect, an embodiment of this application provides a MEC system, including the unified orchestration function entity and the virtualized infrastructure manager VIM according to the second aspect to the sixth aspect, or including the unified orchestration function entity, the VIM, and the CIM according to the second aspect to the sixth aspect.

DESCRIPTION OF EMBODIMENTS

The following describes implementations of embodiments of this application in detail with reference to accompanying drawings of this specification.

In an example, to implement that both a VM and a container can be deployed in a MEC system, a function of an existing network element in the MEC system may be enhanced, so that the network element of the MEC supports container management (for example, deployment and deletion). For example, a VIM in the MEC system can be enhanced, so that the VIM supports VM virtualization management and container management, so that both the VM and the container can be deployed in the MEC system. Specifically, for an enhanced MEC system, refer to FIG. 1.

Figure 1:
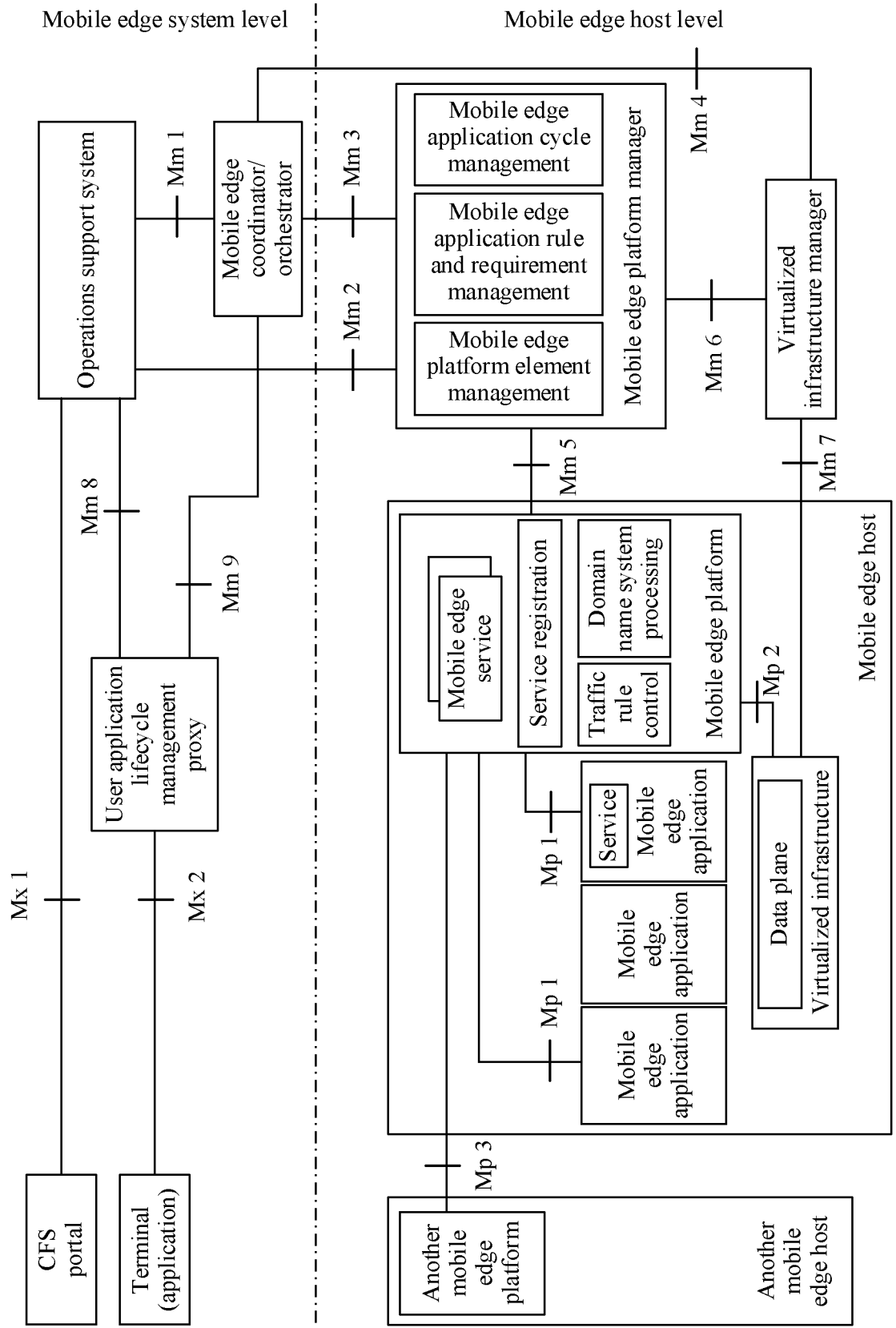
FIG. 1 is a schematic architectural diagram of a MEC system according to an embodiment of this application.

FIG. 1 is a schematic architectural diagram of a MEC system according to an embodiment of this application. As shown in FIG. 1, the MEC system may include two levels: a mobile edge host level and a mobile edge system level. The mobile edge host level may include a plurality of mobile edge hosts, a mobile edge platform manager (MEPM), and a virtualized infrastructure manager (VIM). The mobile edge system level may include a customer facing service portal (CFS portal), a terminal, a user application lifecycle management proxy, an operations support system, a mobile edge coordinator/orchestrator (MEO), and the like.

A mobile edge host may be a physical host and is mainly configured to provide computing, storage, and a network resource for a mobile edge application. The mobile edge host may include a mobile edge platform, a plurality of mobile edge applications (ME APP), and a virtualization infrastructure (VI).

A mobile edge platform MEP is mainly configured to provide a mobile edge service (mobile edge service) for a mobile edge application and provide a service for the mobile edge application, for example, may provide a service for discovery and usage between mobile edge applications.

A mobile edge application may include an application of a virtual machine (virtual machine) running on a virtualized infrastructure, or may include an application running on a container. The mobile edge application may interact with a mobile edge platform to provide a mobile edge service, and may further interact with the mobile edge platform to perform a process related to a life cycle of the mobile edge application, for example, indicating availability of the mobile edge application and relocating a user state. In addition, the mobile edge application also has a specific quantity of rules and requirements associated with the mobile edge application, for example, resources required by the mobile edge application, a maximum delay, a required service, or a useful service.

The mobile edge platform manager MEPM mainly has the following functions: managing a life cycle of a mobile edge application, for example, notifying a mobile edge coordinator/orchestrator of a related event of the mobile edge application; providing an element management function for a mobile edge platform; and managing rules and requirements of the mobile edge application, for example, managing service authorization of the mobile edge application, traffic rules, domain name system (domain name system, DNS) configuration, and resolving a conflict.

The virtualized infrastructure manager (VIM) may support VM virtualization management and container management. The VIM mainly has two functions: first, allocating, managing, and releasing a virtual resource (for example, computing, storage, and a network resource) on a virtual infrastructure; preparing a virtualized infrastructure for running a software image, for example, configuring a virtualized infrastructure, and receiving and storing the software image; and quickly configuring a mobile edge application, for example, collecting and reporting performance and fault information of a virtual resource, and performing moving edge routine relocation; and second, allocating, managing, and releasing a container-related resource (for example, computing, storage, and a network resource); receiving and storing a container image; and supporting quick configuration of a mobile edge application, and collecting and reporting container-related resource performance and fault information.

The mobile edge coordinator/orchestrator MEO is a core functional component at the mobile edge system level, and mainly has the following functions: maintaining an overall view resource, an available mobile edge service, and a topology that are of a mobile edge system based on deployment of a mobile edge host; selecting an appropriate mobile edge host to provide available resources and services for mobile edge application instantiation based on a constraint (for example, a delay of the mobile edge application); triggering mobile edge application instantiation or termination; triggering mobile edge application relocation; and managing a container resource of the mobile edge host, for example, tracking available container resource capacity and managing a container image.

An operation support system can be an OSS of a provider. The operation support system can receive a request from a CFS portal (or a terminal application) for requesting to instantiate an application or terminate an application, and forward the received request to a mobile edge coordinator/orchestrator, and then the mobile edge coordinator/orchestrator executes a subsequent process based on the request.

A terminal may be referred to as terminal equipment, user equipment (UE), a mobile station (MS), a mobile terminal (MT) device, or the like. An application (APP) icon may be disposed on the terminal. Specifically, the terminal may be a mobile phone, a tablet computer, a desktop computer, a laptop computer, a handheld computer, a notebook computer, a personal computer (PC), a netbook, a cellular phone, a personal digital assistant (PDA), a wearable device (for example, a smart watch), a smart home device, a vehicle-mounted computer, and the like. A specific form of the device is not specifically limited in this embodiment.

In the MEC system shown in FIG. 1, mobile edge hosts and components in the mobile edge hosts may communicate with each other through a mobile edge point (Mp). The mobile edge hosts and another device in the MEC system may communicate with each other by using mobile edge management (Mm). Other devices in the MEC system other than the mobile edge hosts may also communicate with each other through an Mm point. Devices in the MEC system may communicate with the terminal or the CFS portal through an interface (for example, an Mx point) with an external entity.

For example, as shown in FIG. 1, a mobile edge platform and a mobile edge application may communicate with each other through an Mp 1, the mobile edge platform and a data plane in a virtualized infrastructure may communicate with each other through an Mp 2, and the mobile edge hosts may communicate with each other through an Mp 3.

An OSS and a mobile edge coordinator/orchestrator may communicate with each other by using Mm 1, and the OSS and the mobile edge platform manager may communicate with each other by using Mm 2. The mobile edge coordinator/orchestrator and the mobile edge platform manager may communicate with each other by using Mm 3, and the mobile edge coordinator/orchestrator and the virtualized infrastructure manager may communicate with each other by using Mm 4. The mobile edge platform manager and the mobile edge platform may communicate with each other by using Mm 5, and the mobile edge platform manager and the virtualized infrastructure manager may communicate with each other by using Mm 6. The virtual infrastructure manager and the virtual infrastructure may communicate with each other through Mm 7. The user application life cycle management proxy and the OSS may communicate with each other by using Mm 8, and the user application life cycle management proxy and the mobile edge coordinator/orchestrator may communicate with each other by using Mm 9.

The CFS portal and the OSS may communicate with each other through Mx 1. The CFS portal may send a request from a third party to the OSS through the Mx 1. The terminal and the user application life cycle management proxy may communicate with each other by using Mx 2, and an app on the terminal may send a request to the user application life cycle management proxy by using the Mx 2, to request to run the mobile edge application or move the mobile edge application into/out of a mobile edge system.

It should be noted that FIG. 1 is merely an example. A quantity of network elements included in the MEC system shown in FIG. 1 is not limited. In addition to the network element shown in FIG. 1, the MEC system may further include another device or the like. In addition, names of devices and names of interfaces between devices in FIG. 1 are not limited. In addition to names shown in FIG. 1, the devices and the interfaces between the devices may have other names, which is not limited.

In another example, to implement that both a VM and a container may be deployed in the MEC system, a function entity for deploying a container may be added to the MEC system, so that the newly added function entity supports container management (for example, deployment and deletion), to deploy a container in the MEC system. Specifically, for an enhanced MEC system, refer to FIG. 2.

Figure 2:
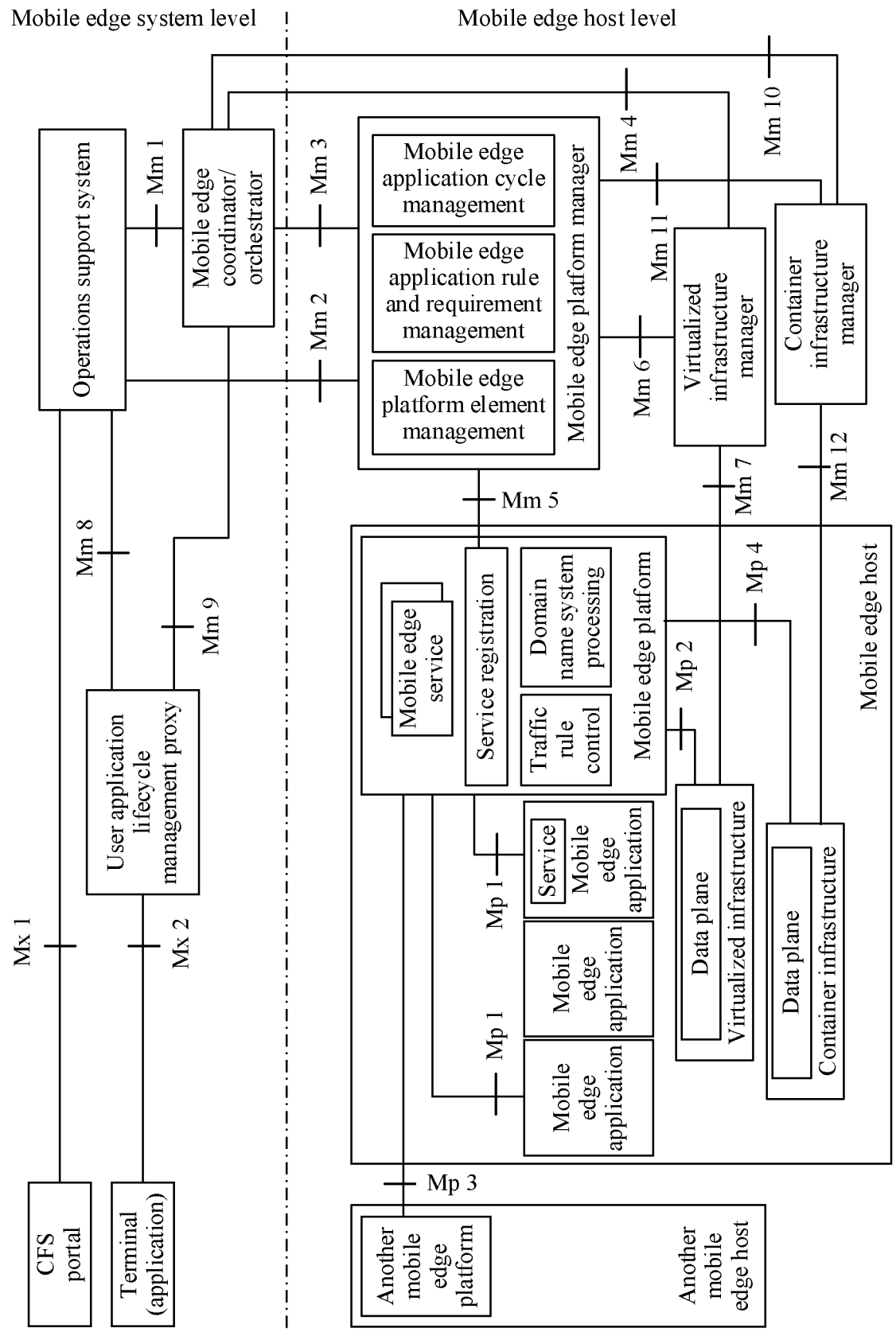
FIG. 2 is a schematic architectural diagram of another MEC system according to an embodiment of this application.

FIG. 2 is a schematic architectural diagram of another MEC system according to an embodiment of this application. As shown in FIG. 2, the MEC system may include two levels: a mobile edge host level (mobile edge host level) and a mobile edge system level. The mobile edge host level may include a plurality of mobile edge hosts (mobile edge host), a mobile edge platform manager (MEPM), a virtualization infrastructure manager (VIM), and a container infrastructure manager (CIM). The mobile edge system level may include a CFS portal, a terminal, a user application lifecycle management proxy (user app LCM proxy), an operations support system, a mobile edge coordinator/orchestrator (MEO), and the like.

For related functions of function entities such as the MEO, the MEPM, and the VIM in the MEC system shown in FIG. 2, refer to the description in FIG. 1. Details are not described again.

A mobile edge host in FIG. 2 may be a physical host and is mainly configured to provide computing, storage, and a network resource for a mobile edge application. The mobile edge host may include a mobile edge platform (mobile edge platform), a plurality of mobile edge applications (ME APP), a virtualization infrastructure (VI), and a container infrastructure (CI). The CI has a function of a container engine, for example, has a function of a docker engine.

The CIM shown in FIG. 2 may support container management. The CIM mainly has the following functions: allocating, managing, and releasing a container-related resource (for example, computing, storage, and a network resource); receiving and storing a container image; and supporting quick configuration of a mobile edge application, and collecting and reporting container-related resource performance and fault information. It should be noted that the CIM and the VIM may be independently deployed in the MEC system shown in FIG. 2, or may be centrally deployed in a same function entity. This is not limited. An example in which the CIM and the VIM are independently deployed in the MEC system shown in FIG. 2 is merely used for description in this embodiment of this application.

Similar to FIG. 1, in the MEC system shown in FIG. 2, mobile edge hosts and components in the mobile edge hosts may communicate with each other through a mobile edge interface (mobile edge point, Mp), the mobile edge hosts and another device in the MEC system may communicate with each other by using mobile edge management (mobile edge management, Mm), and other devices in the MEC system other than the mobile edge hosts may also communicate with each other through an Mm point. Devices in the MEC system may communicate with the terminal or the CFS portal through an interface (for example, an Mx point) with an external entity. For a specific interface, refer to description in FIG. 2.

It should be noted that FIG. 2 is merely an example. A quantity of network elements included in the MEC system shown in FIG. 2 is not limited. In addition to the network element shown in FIG. 2, the MEC system may further include another device or the like. In addition, names of devices and names of interfaces between devices in FIG. 2 are not limited. In addition to names shown in FIG. 2, the devices and the interfaces between the devices may have other names, which is not limited.

The following describes the method provided in the embodiments of this application based on the MEC system shown in FIG. 1 or FIG. 2.

Figure 3:
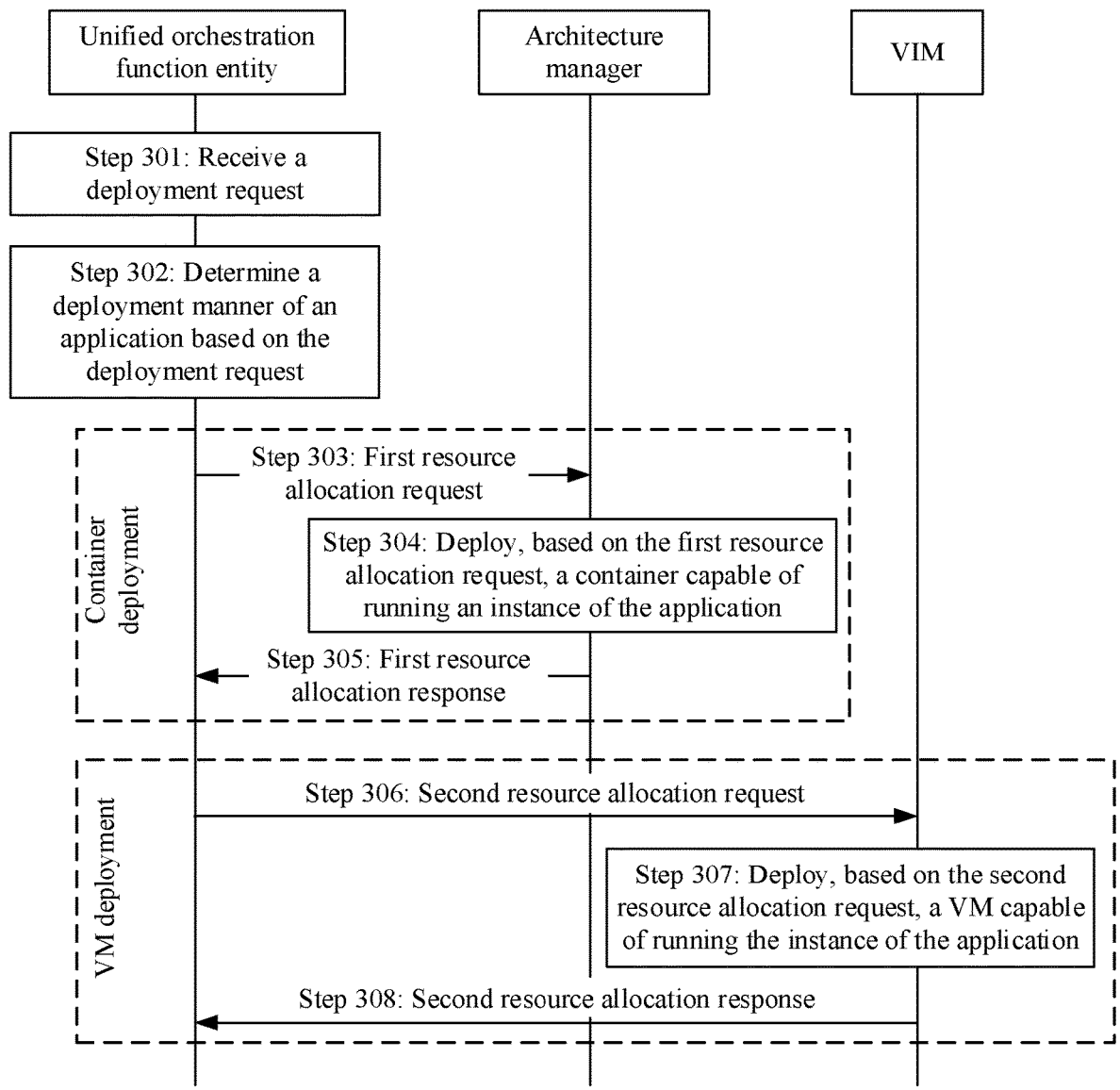
FIG. 3 is a flowchart of a method for deploying a virtual machine and a container according to an embodiment of this application.

FIG. 3 is a method for deploying a virtual machine and a container according to an embodiment of this application. As shown in FIG. 3, the method may include step 301 to step 308.

Step 301: A unified orchestration function entity receives a deployment request.

The unified orchestration function entity may be a MEO or a chip or a system on chip that is in the MEO and that can implement a function performed by the unified orchestration function entity in this embodiment of this application, or may be an MEPM or a chip or a system on chip that is in the MEPM and that can implement a function performed by the unified orchestration function entity in this embodiment of this application. Alternatively, the unified orchestration function entity may include a plurality of function modules configured to implement the method in this embodiment of this application. Some of the plurality of function modules are located in the MEO, and the remaining modules are located in the MEPM, which is not limited. In this embodiment of this application, only an example in which the unified orchestration function entity is the MEO or the MEPM is used for description.

The deployment request may be used to request to initialize an application. The application may be an application (application, APP) of a third-party service, for example, may be a QQ game, a large mobile phone game, or a video surveillance program (face recognition or data analysis) in the MEC system. A deployment manner of the application may include but is not limited to VM deployment, container deployment, or the like. An application may be uniquely identified by an identifier (identifier, ID) of the application, and IDs of different applications are different. For example, the ID of the application may be a unique identifier allocated by the MEO after successfully on-boarding (on-boarding) the application into the MEC system.

Specifically, the deployment request may include but is not limited to the identifier (identifier, ID) and orchestration information of the application, and may further include other information. This is not limited. The orchestration information may include resource information required for instantiation deployment of the application, for example, an image address of the application, a disk type, a stored volume name, and a disk size, and may further include an orchestration type (a VM or a container). The orchestration information may be of a tosca type or a kubernetes-based yaml type. For example, the orchestration information may include a keyword or some special parameters, and the orchestration information may be identified by using the keyword or the special parameters.

For example, the deployment manner of the application is the VM deployment. The orchestration information may be as follows, and may include basic information of the application, a storage resource of the application, and the like. The basic information of the application may include basic node information, the deployment manner of the application, storage information, and the like. The basic node information may include a node template (node_templates), a software development tool (sdk-appgroud), a node type (type:hwpaas.node.Appgroup), a requirement (requirements), a member (member), a node name (node: sdk-app), a node relationship (relationship:hwpass.relationships.Consistsof), and the like. The deployment manner of the application may include an application package (package), a node deployment manner (node:sdk-VM), and a node relationship (relationship:hwpass.relationship.PackageConsistsor). The storage information may include a volume (volume), a node system disk (node:system_disk), a node relationship (relationship:hwpass.relationship.Attachesto), a volume (volume), a node (node:data_disk), a node relationship (relationship:hwpass.relationship.AttachesTo), and the like. The storage resource of the application may include a system disk (system_disk), a type (type:hwpaas.nodes.LocalVolume), a property (properties), a type (type:local_storage), a name (name:test), lvmType:system, a volume type (volumeType:high IO), a device (devices:/dev/sdc), a volume type (volumeType:"high IO"), a size (size:20 G), a mode (mode:private), a stripe (stripe:true), and a deletion policy (deletePolicy:reserved) and the like.

```
node_templates:
  sdk-appgroud:
    type:hwpaas.node.Appgroup
    requirements:
      -member:
        node: sdk-app
        relationship:hwpass.relationships.Consistsof
  sdk-app:
    type:hwpaas.nodes.Application
    Properties
      type: VM
    requirements:
      -package:
        node:sdk-VM
        relationship:hwpass.relationship.PackageConsistsor
      -volume:
        node:system_disk
        relationship:hwpass.relationship.Attachesto
      -volume:
        node:data_disk
        relationship:hwpass.relationship.AttachesTo
  sdk_VM:
    type:hwpaas.node.SoftwareComponent
    properties:
      package_type:VM
      image:{get_input:VM_image_url}
      cpu:
      mem:
  system_disk
    type:hwpaas.nodes.LocalVolume
    properties:
      type:local_storage
      name:test
      lvmType:system
      volumeType:high IO
      devices:/dev/sdc
      volumeType:"high IO"
      size:20 G
      mode:private
      stripe:true
      deletePolicy:reserved
```

In an example, the unified orchestration function entity is the MEO in FIG. 1 or FIG. 2. That a unified orchestration function entity receives a deployment request may include: The unified orchestration function entity receives a deployment request sent by the OSS by using the Mm 1. The deployment request may be sent to the OSS by a CFS portal or a user app LCM proxy. Alternatively, the unified orchestration function entity receives a deployment request sent by a user app LCM proxy by using the Mm 9. The deployment request may be sent by an APP on a terminal to the user app LCM proxy.

In another example, the unified orchestration function entity is the MEPM in FIG. 1 or FIG. 2. That a unified orchestration function entity receives a deployment request may include: The unified orchestration function entity receives a deployment request sent by the OSS by using the Mm 2, where the deployment request may be sent to the OSS by the CFS portal or the user app LCM proxy, or the unified orchestration function entity receives a deployment request sent by the MEO by using the Mm 3, where the MEO may obtain and send the deployment request to the MEPM in the foregoing manner. Details are not described again.

In another example, when the MEO receives the deployment request and forwards the deployment request to the MEPM, the method may further include: The MEO obtains instance configuration data of the application, and forwards the deployment request to the MEPM based on the instance configuration data of the application. The instance configuration data of the application may include information about a node on which an instance of the application is deployed, about a deployment manner of the instance of the application, and about resources required for deploying the instance of the application in this deployment manner (for example, a computing resource, a network resource, and a storage resource). That the MEO forwards the deployment request to the MEPM based on the instance configuration data of the application may include: When the instance of the application is deployed in a deployment manner specified by the instance configuration data of the application, if a node that can deploy the instance of the application and resources required for deploying the instance of the application exist in the MEC system, the MEC system forwards the deployment request to the MEPM; otherwise, if no node that can deploy the instance of the application or no resource required for deploying the instance of the application exists in the MEC system, the MEC system refuses to forward the deployment request to the MEPM.

Step 302: The unified orchestration function entity determines the deployment manner of the application based on the deployment request.

In an example, the deployment request includes the orchestration information, and a type of the orchestration information is different for different deployment manners. For example, when the deployment manner of the application is the VM deployment, the orchestration information may be of the tosca type, and when the deployment manner of the application is the container deployment, the orchestration information may be of the yaml type.

After receiving the deployment request, the unified orchestration function entity parses the deployment request to obtain the orchestration information included in the deployment request, and determines the deployment manner of the application based on the type of the orchestration information. For example, if the orchestration information is of the tosca type, it is determined that the deployment manner of the application is the VM deployment; and if the orchestration information is the yaml type, it is determined that the deployment manner of the application is the container deployment.

The unified orchestration function entity may include a keyword included in the orchestration information to determine the type of the orchestration information. For example, the orchestration information includes an orchestration type (a VM or a container). If the orchestration type is a VM, it is determined that the orchestration information is of the tosca type, and the deployment manner of the application is the VM deployment; otherwise, if the orchestration type is a container, it is determined that the orchestration information is of the yaml type, and the deployment manner of the application is the container deployment.

In another example, the deployment request may include a deployment type identifier, and the deployment type identifier may be used to indicate the deployment manner of the application. After receiving the deployment request, the unified orchestration function entity may parse the deployment request, and determine the deployment manner of the application based on the deployment type identifier included in the deployment request.

The deployment type identifier may be a quantity of binary bits, for example, 0 or 1, where "0" indicates the VM deployment, and "1" indicates the container deployment; or may be another identifier (identifier) used to indicate the deployment manner of the application, for example, may be an identifier that is formed by combining information in any form such as a number, a letter, or a symbol and is easy to understand by a user. This is not limited.

It should be noted that the deployment type identifier may be included in a newly added information element in the deployment request, or may be included in the orchestration information included in the deployment request. This is not limited. In addition to the orchestration information and the deployment type identifier, the deployment request may further include other information.

For example, Table 1 shows content included in the deployment request. As shown in Table 1, the deployment request may forcibly include a deployment type identifier (or referred to as a deployment method (deploy method)), an ID of an instance of an application (or an ID of the application), virtual storage descriptor (virtual storage descriptor), and mobile edge host information (mobile edge host information), and optionally, may further include a virtual machine description (virtual compute description), a container description (container description), and the like. In Table 1, N is an integer greater than 1.

TABLE 1

| Property name | Constraint | Cardinality | Data type | Description |
|---|---|---|---|---|
| Deployment type identifier | Mandatory | 1 | Character string | An identifier that is used to identify a deployment manner of an application, may be used to, for example, identify an instance that runs the application by using a VM, or an instance that runs the application by using a container |
| ID of an instance of an application | Mandatory | 1 | Character string | An identifier that is used to identify an instance of an application and that is generated during creation of the instance of the application |
| Virtual machine description | Optional | 0 . . . 1 | Virtual machine descriptor | Describe computing, storage, and network resources required for creating a VM, where this attribute is valid only when a deployment manner is VM deployment |
| Container description | Optional | 0 . . . 1 | Container descriptor | Describe computing, storage, and network resources required for creating a VM, where this attribute is valid only when a deployment mode is container deployment |
| Virtual storage information | Mandatory | 0 . . . N | Virtual storage descriptor | A descriptor that defines a virtual storage resource used by a to-be-created instance of an application |
| Mobile edge host information | Mandatory | 1 . . . N | Mobile edge host descriptor | Describe information that of a mobile edge host selected for an instance of an application |

In still another example, the deployment request may include the ID of the application, and a correspondence exists between the ID of the application and the deployment manner of the application. After receiving the deployment request, the unified orchestration function entity may parse the deployment request, and determine, based on the ID of the application included in the deployment request and a pre-stored correspondence between the ID of the application and the deployment manner of the application, the deployment manner of the application requested by the deployment request.

The ID of the application may be included in the orchestration information of the deployment request, or may be included in the deployment request independently of the orchestration information. This is not limited.

The ID of the application and the deployment manner of the application may be pre-stored in the MEO or the MEPM. For example, the MEO may receive a request for on-boarding (on-board) an application that is sent by the OSS and that includes the application and the deployment manner of the application. The application is on-boarded based on the request for on-boarding an application. After the application is successfully on-boarded into the MEC system, the MEO may allocate a unique ID to the application, and correspondingly store the ID of the application and the deployment manner of the application on the MEO or the MEPM.

For example, Table 2 shows the correspondence between an ID of an application and a deployment manner of the application. As shown in Table 2, a deployment manner corresponding to an APP 1 is the VM deployment, a deployment manner of an APP 2 is the container deployment, and a deployment manner of an APP 3 is the container deployment. When the ID of the application included in the deployment request is the APP 1, the unified orchestration function entity may query Table 2 by using the APP 1 as an index, and determine that the deployment manner corresponding to the APP 1 is the VM deployment. When the ID of the application included in the deployment request is the APP 2, the unified orchestration function entity may query Table 2 by using the APP 2 as an index, and determine that the deployment manner corresponding to the APP 2 is the container deployment. When the ID of the application included in the deployment request is the APP 3, the unified orchestration function entity may query Table 2 by using the APP 3 as an index, and determine that the deployment manner corresponding to the APP 3 is the container deployment.

TABLE 2

| ID of an instance of an application | Deployment manner of an application |
| --- | --- |
| APP 1 | VM deployment |
| APP 2 | Container deployment |
| APP 3 | Container deployment |

Further, after step 302, if it is determined that the deployment manner of the application is the container deployment in step 302, step 303 to step 305 are performed; or if the deployment manner of the application is the VM deployment, step 306 to step 308 are performed.

Step 303: The unified orchestration function entity sends a first resource allocation request to an architecture manager.

When the method shown in FIG. 3 is performed based on FIG. 1, the architecture manager may be the VIM in FIG. 1 or a function module in the VIM, for example, may be a chip or a system on chip that is in the VIM and that can perform a function performed by the architecture manager in this embodiment of this application. When the method shown in FIG. 3 is performed based on FIG. 2, the architecture manager may be the CIM in FIG. 2 or a function module in the CIM, for example, may be a chip or a system on chip that is in the CIM and that can perform a function performed by the architecture manager in this embodiment of this application. This is not limited. This embodiment of this application is described only by using an example in which the architecture manager is the VIM in FIG. 1 or the CIM in FIG. 2.

The first resource allocation request may be used to request resources required for deploying a container that can run the instance of the application, for example, a computing resource, a network resource, and a storage resource. The first resource allocation request may include the ID of the application, an identifier of the container deployment, and resource information required for deploying the application in a container deployment manner. The identifier of the container deployment may be used to identify that the deployment manner of the application is the container deployment. Resource information required for the container deployment may include a computing resource, a storage resource, and a network resource that are required for deploying the application in the container deployment manner. For example, the resource information required for the container deployment may specifically include a container image address, a disk type, a volume name, a disk size, and the like.

For example, when the unified orchestration function entity is the MEO, and the architecture manager is the VIM in FIG. 1, as shown in FIG. 1, the unified orchestration function entity may send the first resource allocation request to the architecture manager by using the Mm 4.

When the unified orchestration function entity is the MEPM, and the architecture manager is the VIM in FIG. 1, as shown in FIG. 1, the unified orchestration function entity may send the first resource allocation request to the architecture manager by using the Mm 6.

When the unified orchestration function entity is the MEO, and the architecture manager is the CIM in FIG. 2, as shown in FIG. 2, the unified orchestration function entity may send the first resource allocation request to the architecture manager by using Mm 10.

When the unified orchestration function entity is the MEPM, and the architecture manager is the CIM in FIG. 2, as shown in FIG. 2, the unified orchestration function entity may send the first resource allocation request to the architecture manager by using Mm 11.

Step 304: The architecture manager receives the first resource allocation request, and deploys, based on the first resource allocation request, a container that can run the instance of the application.

For example, for a manner in which the architecture manager deploys, based on the first resource allocation request, the container that can run the instance of the application, refer to the conventional technology. For example, the architecture manager finds a container image repository based on the container image address, and downloads a container image of the application from the container image repository; invokes a storage plug-in to request to create a storage volume; requests a container engine to create a pause container; and requests a network plug-in to create CNI Add( ) and requests the container engine to create and run the container.

It should be noted that, before the architecture manager downloads the container image of the application from the container image repository, the architecture manager needs to check whether the container image of the application exists in the container image repository. If the container image does not exist, container deployment of the application fails. If the container image exists, the architecture manager checks whether the container image of the application is available. If the container image is available, the architecture manager downloads the container image from the container image repository and executes a container deployment procedure. If the container image is unavailable, container deployment of the application fails.

The container image repository stores the ID of the application and status information (available or unavailable) of the application. If an ID that is the same as the ID of the application included in the first resource allocation request exists in the container image repository, it is determined that the container image of the application exists in the container image repository. If no ID that is the same as the ID of the application included in the first resource allocation request exists in the container image repository, the container image of the application does not exist. If status information of the application identified by the ID of the application included in the first resource allocation request is available, it is determined that the container image of the application existing in the container image repository is available. If status information of the application identified by the ID of the application included in the first resource allocation request is unavailable, the container image of the application existing in the container repository is unavailable.

Step 305: The architecture manager sends a first resource allocation response to the unified orchestration function entity.

The first resource allocation response may be used to indicate that the architecture manager successfully deploys the container. The first resource allocation response may include the ID of the application.

For example, when the architecture manager is the MEO, and the architecture manager is the VIM in FIG. 1, as shown in FIG. 1, the architecture manager may send the first resource allocation response to the unified orchestration function entity by using the Mm 4.

When the architecture manager is the MEPM, and the architecture manager is the VIM in FIG. 1, as shown in FIG. 1, the architecture manager may send the first resource allocation response to the unified orchestration function entity by using the Mm 6.

When the architecture manager is the MEO, and the architecture manager is the CIM in FIG. 2, as shown in FIG. 2, the architecture manager may send the first resource allocation response to the unified orchestration function entity by using the Mm 10.

When the architecture manager is the MEPM, and the architecture manager is the CIM in FIG. 2, as shown in FIG. 2, the architecture manager may send the first resource allocation response to the unified orchestration function entity by using the Mm 11.

Step 306: The unified orchestration function entity sends a second resource allocation request to the VIM.

The second resource allocation request may be used to request resources required for deploying a VM that can run the instance of the application, for example, a computing resource, a network resource, and a storage resource. The second resource allocation request may include the ID of the application, an identifier of the VM deployment, and resource information required for deploying the application in a VM deployment manner. The identifier of the VM deployment may be used to identify that the deployment manner of the application is the VM deployment. Resource information required for the VM deployment may include a computing resource, a storage resource, and a network resource that are required for deploying the application in the VM deployment manner. For example, the resource information required for the VM deployment may specifically include a VM image address, a disk type, a volume name, a disk size, and the like.

For example, as shown in FIG. 1 or FIG. 2, the unified orchestration function entity may send the second resource allocation request to the VIM by using the Mm 6.

Step 307: The VIM receives the second resource allocation request, and deploys, based on the second resource allocation request, a VM that can run the instance of the application.

For example, for a manner in which the VIM deploys, based on the second resource allocation request, the VM that can run the instance of the application, refer to the conventional technology. For example, the VIM may download a VM image of the application from a VM image repository based on a VM image address; invoke a storage plug-in to request to create a storage volume; request a VM engine to create a psuseVM; and request a network plug-in to create a network plane and invoke libvirt to create and run the VM.

It should be noted that, before the VIM downloads the VM image of the application from the VM image repository, the VIM needs to check whether the VM image of the application exists in the VM image repository. If the VM image does not exist, VM deployment of the application fails. If the VM image exists, the VIM checks whether the VM image of the application is available. If the VM image is available, the VIM downloads the VM image from the VM image repository and executes a VM deployment procedure. If the container image is unavailable, VM deployment of the application fails.

The VM image repository stores the ID of the application and status information (available or unavailable) of the application. If an ID that is the same as the ID of the application included in the second resource allocation request exists in the VM image repository, it is determined that the VM image of the application exists in the VM image repository. If no ID that is the same as the ID of the application included in the second resource allocation request exists in the VM image repository, the VM image of the application does not exist. If status information of the application identified by the ID of the application included in the second resource allocation request is available, it is determined that the VM image of the application existing in the VM repository is available. If status information of the application identified by the ID of the application included in the second resource allocation request is unavailable, the VM image of the application existing in the VM repository is unavailable.

Step 308: The VIM sends a second resource allocation response to the unified orchestration function entity.

The second resource allocation response may be used to indicate that the VIM successfully deploys the VM. The second resource allocation response may include the ID of the application. For example, as shown in FIG. 1 or FIG. 2, the VIM may send the second resource allocation response to the unified orchestration function entity by using the Mm 6.

Based on the method according to FIG. 3, after receiving an application deployment request, the received deployment request may be analyzed, and a deployment manner (the container deployment or the VM deployment) of an application requested to be deployed may be determined. If the deployment manner is the container deployment, a resource allocation request is sent to the VIM or the CIM, and resources required for deploying the application in the container deployment manner is requested, to complete container deployment of the application. If the deployment manner is the VM deployment, a resource allocation request is sent to the VIM, and resources required for deploying the application in the VM deployment manner is requested, to complete VM deployment of the application. In this way, both the VM deployment and the container deployment may be implemented in the MEC system.

Further, in the method shown in FIG. 3, an example in which the unified orchestration function entity is the MEPM is used. After receiving the first resource allocation response, the unified orchestration function entity may send a first configuration request to the MEP. The first configuration request may be used to request the MEP to configure a traffic rule, a domain name system (domain name system, DNS) rule, a service, a service generated by the instance of the application, and the like that are followed for running the instance of the application on a container. The first configuration request may include the traffic rule, the DNS rule, mandatory and optional services, the service generated by the instance of the application, and the like that are followed for running the instance of the application on the container. After receiving the first configuration request, the MEP may configure a traffic rule, a DNS rule, and the like for the instance of the application based on the first configuration request, and send a response of the first configuration request to the unified orchestration function entity after configuration succeeds. The response of the first configuration request may be used to indicate that the traffic rule, the DNS rule, and the like followed by the instance of the application are successfully configured.

Similarly, after receiving the second resource allocation response, the unified orchestration function entity may send a second configuration request to the MEP. The second configuration request may be used to request the MEP to configure a traffic rule, a DNS rule, mandatory and optional services, a service generated by an instance of an application, and the like that are followed for running the instance of the application on the VM. The second configuration request may include the traffic rule, the DNS rule, the mandatory and optional services, the service generated by the instance of the application, and the like that are followed for running the instance of the application on the VM. After receiving the second configuration request, the MEP may configure a traffic rule, a DNS rule, and the like for the instance of the application based on the second configuration request, and send a response of the second configuration request to the unified orchestration function entity after configuration succeeds. The response of the second configuration request may be used to indicate that the traffic rule, the DNS rule, and the like followed by the instance of the application are successfully configured.

It should be noted that, when the unified orchestration function entity is the MEO, the MEO may forward the received first resource allocation response or the received second resource allocation response to the MEPM, so that the MEPM performs the foregoing process after receiving the first resource allocation response or the second resource allocation response. Details are not described again.

Further, in the method shown in FIG. 3, an example in which the unified orchestration function entity is the MEPM is used. After the unified orchestration function entity receives the response of the first configuration request or the response of the second configuration request, the MEPM may consider that instantiation deployment of the application is completed, and may send a response of the deployment request to the OSS or to the OSS by using the MEO.

The response of the deployment request corresponds to the deployment request in step 301, and may be used to indicate that the instantiation deployment of the application is successfully completed. The response of the deployment request may include resource information allocated to the instance of the application, for example, may include a computing resource, a network resource, a storage resource, and the like that are allocated to the instance of the application.

Further, when the deployed instance of the application is not required, to reduce resource consumption, the instance of the application may be further terminated, and resources occupied by the instance of the application is released. Specifically, referring to FIG. 4, a process of terminating an instance of an application may include following steps.

Step 401: A unified orchestration function entity receives a termination request.

The unified orchestration function entity may be as described in step 301, and details are not described again.

The termination request may be used to request to terminate the instance of the application, and the termination request may include an ID of the application. The instance of the application may be an instance deployed in a container deployment manner or a VM deployment manner.

For example, Table 3 below shows content included in the termination request. As shown in Table 3, the termination request may forcibly include a termination type (termination type), and an ID of an instance of an application (or an ID of an application), and optionally, may further include a graceful termination timeout (graceful termination timeout), and the like. In Table 3, N is an integer greater than 1.

TABLE 3

| Property name | Constraint | Cardinality | Data type | Description |
| --- | --- | --- | --- | --- |
| ID of an instance of an application | Mandatory | 1 ... N | Character string | An identifier that is used to identify an instance of an application and that is generated during creation of the instance of the application |
| Termination type | Mandatory | 1 ... N | Enumeration | A mobile edge application instance may terminate normally or forcefully; graceful termination means that a mobile edge platform manager provides a mobile edge application with an application-level termination time, after which the mobile edge application has terminated at an application layer, and the mobile edge system releases resources used by the mobile edge application; forcible termination means immediately closing the mobile edge application and releasing the resource; and after the graceful termination, a timer closes the mobile edge application and releases the resource at a specified time interval |

TABLE 3-continued

| Property name | Constraint | Cardinality | Data type | Description |
| --- | --- | --- | --- | --- |
| Graceful termination timeout | Optional | 0 ... N | Integer type | Time used to describe gracefully terminating an instance of an application |

For example, the unified orchestration function entity is the MEO in FIG. 1 or FIG. 2. That a unified orchestration function entity receives a termination request may include: The unified orchestration function entity receives a termination request sent by an OSS by using Mm 1, where the termination request may be sent to the OSS by a CFS portal or a user app LCM proxy, or the unified orchestration function entity receives a termination request sent by a user app LCM proxy by using Mm 9, where the termination request may be sent by an APP on a terminal to the user app LCM proxy.

In another example, the unified orchestration function entity is the MEPM in FIG. 1 or FIG. 2. That a unified orchestration function entity receives a termination request may include: The unified orchestration function entity receives a termination request sent by the OSS by using Mm 2, where the termination request may be sent to the OSS by the CFS portal or the user app LCM proxy, or the unified orchestration function entity receives a termination request sent by a MEO by using Mm 3, where the MEO may obtain and send the termination request to the MEPM in the foregoing manner. Details are not described again.

Step 402: The unified orchestration function entity sends the termination request to a MEP.

Step 403: The MEP receives the termination request, and terminates the instance of the application based on the termination request.

That the MEP terminates the instance of the application based on the termination request in step 403 may further be described as that the MEP destroys the instance of the application based on the termination request, which is not limited.

In an example, that the MEP terminates the instance of the application based on the termination request may include: The MEP sends a termination notification to the instance of the application by using a Mp 1; after receiving the termination notification, the instance of the application terminates the instance of the application based on the termination notification, and sends a termination response to the MEP; and after receiving the termination response, the MEP considers that the instance of the application is terminated.

In another example, a timer may be set in the MEP. After the MEP sends the termination notification to the instance of the application by using the Mp 1, the timer is started. When the timer expires, the instance of the application is terminated without receiving the termination response sent by the instance of the application before terminating the instance of the application.

Step 404: The MEP sends a termination response to the unified orchestration function entity.

The termination response may be used to indicate that the instance of the application is successfully terminated.

Step 405: The unified orchestration function entity determines a deployment manner of the application based on the termination request; and if the deployment manner of the application is container deployment, step 406 to step 408 are performed; or if the deployment manner of the application is VM deployment, step 409 to step 411 are performed.

For a process in which the unified orchestration function entity determines the deployment manner of the application in step 405, refer to step 302. Details are not described again.

Step 406: The unified orchestration function entity sends a first resource deletion request to an architecture manager.

The architecture manager, as described in step 303, may be a VIM or a CIM.

The first resource deletion request may be used to request the architecture manager to delete a container used to run the instance of the application.

Step 407: The architecture manager receives the first resource deletion request, and deletes the container based on the first resource deletion request.

For a manner in which the architecture manager deletes the container based on the first resource deletion request, refer to the conventional technology. For example, the architecture manager may delete (or release) all resources occupied by the container, for example, a computing resource, a storage resource, and a network resource.

Step 408: The architecture manager sends a first resource deletion response to the unified orchestration function entity, and the unified orchestration function entity receives the first resource deletion request.

The first resource deletion response may be used to indicate that the container corresponding to the instance of the application is successfully deleted.

Step 409: The unified orchestration function entity sends a second resource deletion request to a VIM.

The second resource deletion request may be used to request the VIM to delete a VM used to run the instance of the application.

Step 410: The VIM receives the second resource deletion request, and deletes the VM based on the second resource deletion request.

Step 411: The VIM sends a second resource deletion response to the unified orchestration function entity, and the unified orchestration function entity receives the second resource deletion request.

The second resource deletion response may be used to indicate that the VM corresponding to the instance of the application is successfully deleted.

Step 412: The unified orchestration function entity sends a response of the termination request.

The response of the termination request is a response corresponding to the termination request in step 401, and may include the ID of the application. The response of the termination request may be used to indicate that the instance of the application is successfully terminated and resources occupied by the instance of the application is deleted.

For example, the unified orchestration function entity may send the response of the termination request to the OSS.

Figure 4:
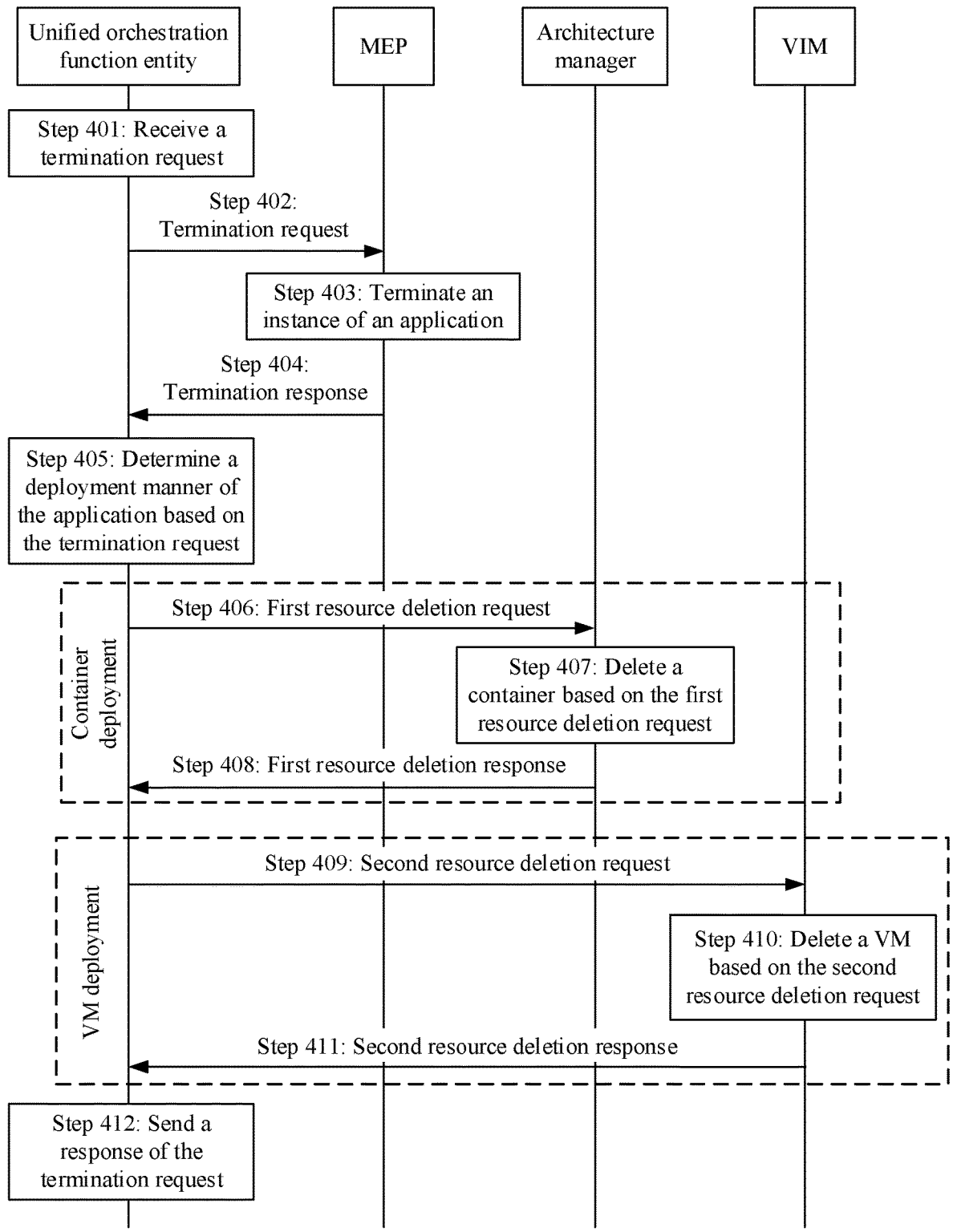
FIG. 4 is a flowchart of a method for terminating an instance of an application according to an embodiment of this application.

Based on the method shown in FIG. 4, when the instance of the application is not required, the instance of the application may be terminated and the resources occupied by the instance of the application may be deleted. This improves resource utilization.

With reference to the MEC system shown in FIG. 1, the following describes the method shown in FIG. 3 by using an example in which a unified orchestration function entity is an MEPM and an architecture manager is a VIM.

Figure 5A:
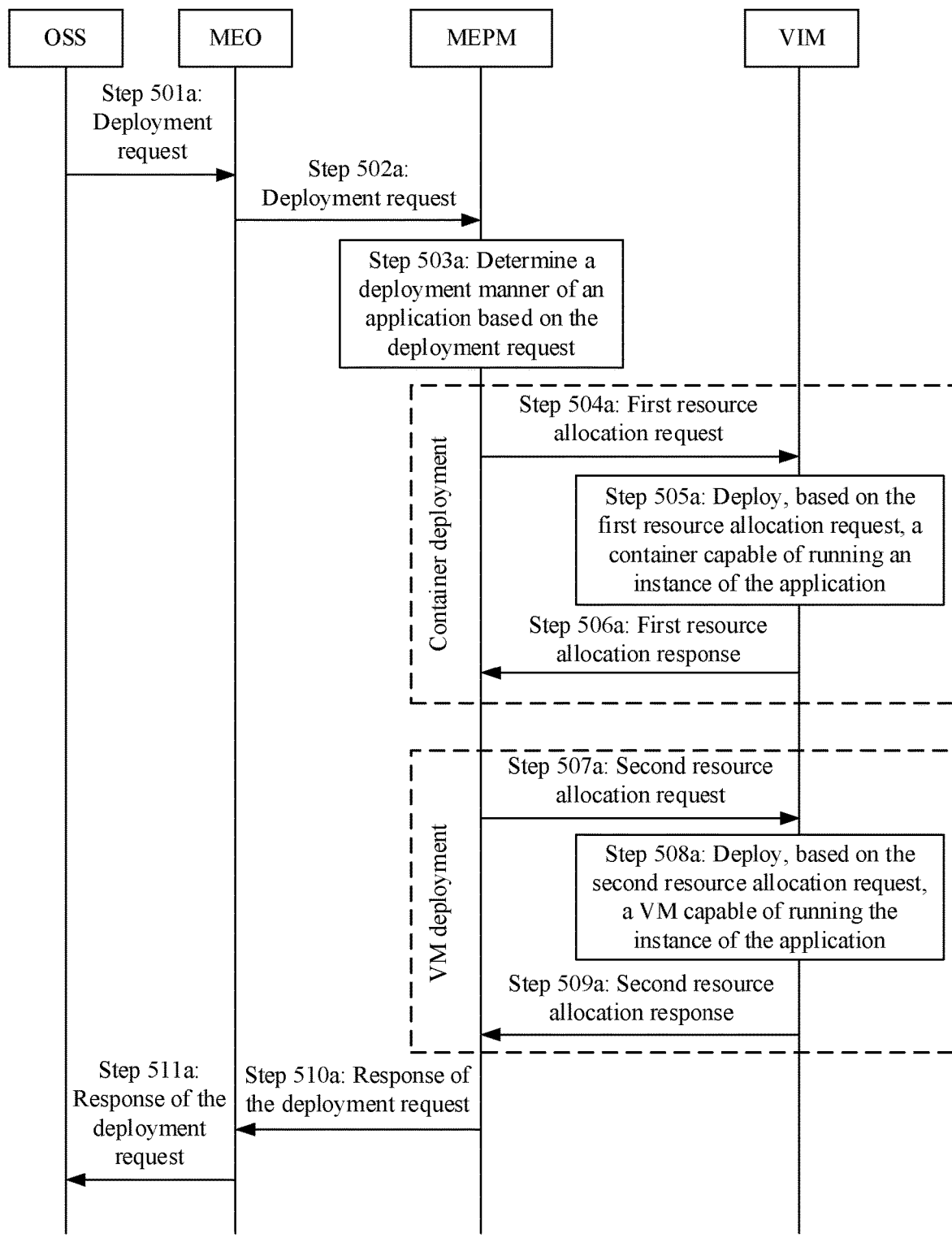
FIG. 5a is a flowchart of another method for deploying a virtual machine and a container according to an embodiment of this application.

FIG. 5a is a flowchart of another method for deploying a virtual machine and a container according to an embodiment of this application. As shown in FIG. 5a, the method may include following steps.

Step 501a: An OSS sends a deployment request to a MEO.

For related description of the deployment request, refer to step 301. Details are not described again.

Step 502a: The MEO receives the deployment request, and sends the deployment request to an MEPM.

Step 503a: The MEPM receives the deployment request, and determines a deployment manner of an application based on the deployment request; and if the deployment manner of the application is container deployment, step 504a to step 506a are performed; or if the deployment manner of the application is VM deployment, step 507a to step 509a are performed.

For step 503a, refer to the description of step 302. Details are not described again.

Step 504a: The MEPM sends a first resource allocation request to a VIM.

For related description of the first resource allocation request and an execution process of step 504a, refer to step 303. Details are not described again.

Step 505a: The VIM receives the first resource allocation request, and deploys, based on the first resource allocation request, a container that can run an instance of the application.

For step 505a, refer to the description of step 304. Details are not described again.

Step 506a: The VIM sends a first resource allocation response to the MEPM, and the MEPM receives the first resource allocation response.

For step 506a, refer to the description of step 305. Details are not described again.

Step 507a: The MEPM sends a second resource allocation request to the VIM.

For related description of the second resource allocation request and an execution process of step 507a, refer to step 306. Details are not described again.

Step 508a: The VIM receives the second resource allocation request, and deploys, based on the second resource allocation request, a VM that can run the instance of the application.

For step 508a, refer to the description of step 307. Details are not described again.

Step 509a: The VIM sends a second resource allocation response to the MEPM, and the MEPM receives the second resource allocation response.

For step 509a, refer to the description of step 308. Details are not described again.

Step 510a: The MEPM sends a response of the deployment request to the MEO.

Step 511a: The MEO receives the response of the deployment request, and sends the response of the deployment request to the OSS.

Based on the method according to FIG. 5a, after receiving an application deployment request, the received deployment request may be analyzed, and a deployment manner (the container deployment or the VM deployment) of an application requested to be deployed may be determined. If the deployment manner is the container deployment, a resource allocation request is sent to the CIM, and resources required for deploying the application in the container deployment manner is requested, to complete container deployment of the application. If the deployment manner is the VM deployment, a resource allocation request is sent to the VIM, and resources required for deploying the application in the VM deployment manner is requested, to complete VM deployment of the application. In this way, both the VM deployment and the container deployment may be implemented in the MEC system.

With reference to the MEC system shown in FIG. 2, the following describes the method shown in FIG. 3 by using an example in which a unified orchestration function entity is an MEPM and an architecture manager is a CIM.

Figure 5B:
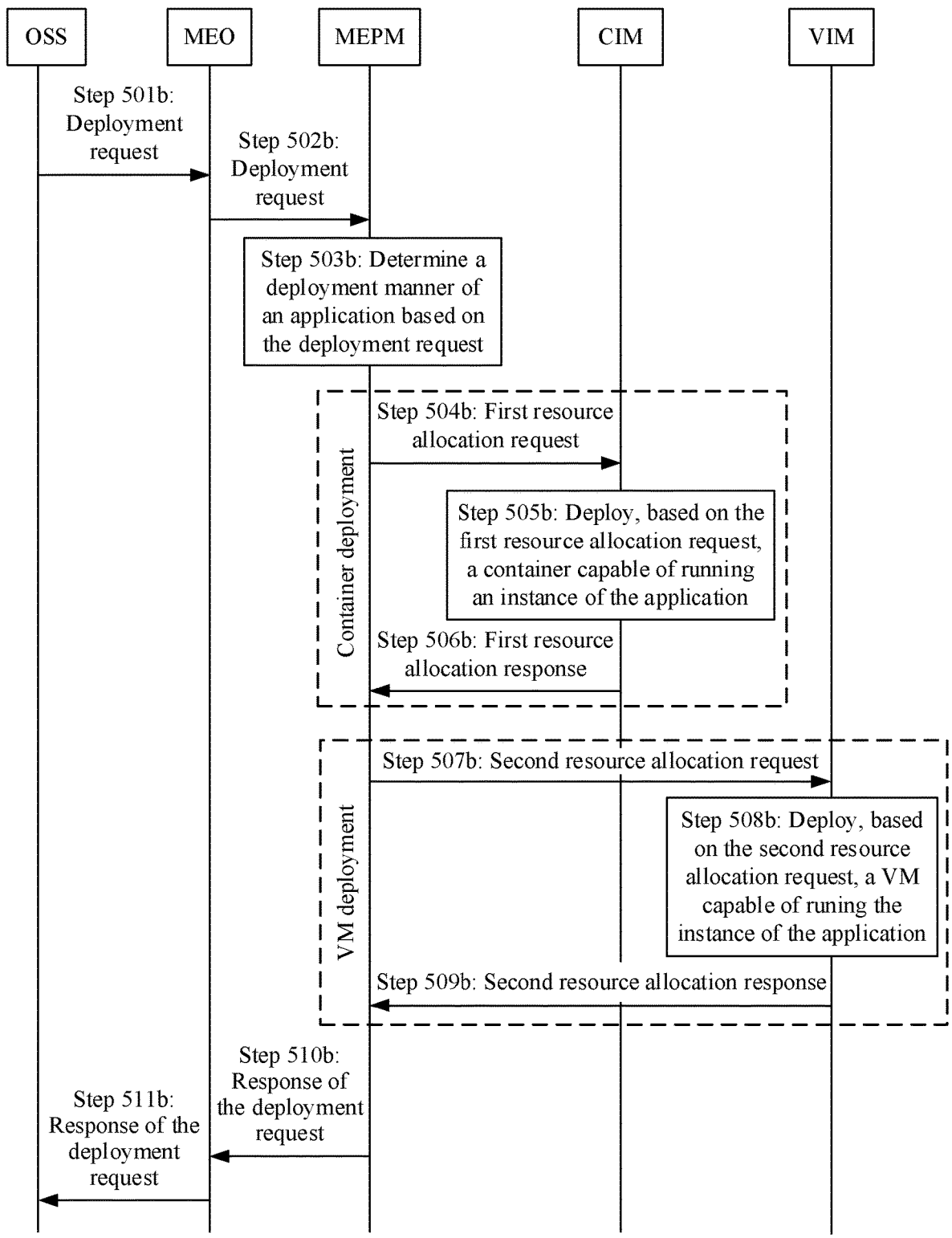
FIG. 5b is a flowchart of still another method for deploying a virtual machine and a container according to an embodiment of this application.

FIG. 5b is a flowchart of another method for deploying a virtual machine and a container according to an embodiment of this application. As shown in FIG. 5b, the method may include following steps.

Step 501b: An OSS sends a deployment request to a MEO.

For related description of the deployment request, refer to step 301. Details are not described again.

Step 502b: The MEO receives the deployment request, and sends the deployment request to an MEPM.

Step 503b: The MEPM receives the deployment request, and determines a deployment manner of an application based on the deployment request; and if the deployment manner of the application is container deployment, step 504b to step 506b are performed; or if the deployment manner of the application is VM deployment, step 507b to step 509b are performed.

For step 503b, refer to the description of step 302. Details are not described again.

Step 504b: The MEPM sends a first resource allocation request to a CIM.

For related description of the first resource allocation request and an execution process of step 504b, refer to step 303. Details are not described again.

Step 505b: The CIM receives the first resource allocation request, and deploys, based on the first resource allocation request, a container that can run an instance of the application.

For step 505b, refer to the description of step 304. Details are not described again.

Step 506b: The CIM sends a first resource allocation response to the MEPM, and the MEPM receives the first resource allocation response.

For step 506b, refer to the description of step 305. Details are not described again.

Step 507b: The MEPM sends a second resource allocation request to a VIM.

For related description of the second resource allocation request and an execution process of step 507b, refer to step 306. Details are not described again.

Step 508b: The VIM receives the second resource allocation request, and deploys, based on the second resource allocation request, a VM that can run the instance of the application.

For step 508b, refer to the description of step 307. Details are not described again.

Step 509b: The VIM sends a second resource allocation response to the MEPM, and the MEPM receives the second resource allocation response.

For step 509b, refer to the description of step 308. Details are not described again.

Step 510b: The MEPM sends a response of the deployment request to the MEO.

Step 511b: The MEO receives the response of the deployment request, and sends the response of the deployment request to the OSS.

Based on the method according to FIG. 5b, after receiving an application deployment request, the received deployment request may be analyzed, and a deployment manner (the container deployment or the VM deployment) of an application requested to be deployed may be determined. If the deployment manner is the container deployment, a resource allocation request is sent to the CIM, and resources required for deploying the application in the container deployment manner is requested, to complete container deployment of the application. If the deployment manner is the VM deployment, a resource allocation request is sent to the VIM, and resources required for deploying the application in the VM deployment manner is requested, to complete VM deployment of the application. In this way, both the VM deployment and the container deployment may be implemented in the MEC system.

As a reverse process of deploying the instance of the application, when the deployed instance of the application is not required, to save resources, the instance of the application may be further terminated, and resources occupied by the instance of the application is released. With reference to the MEC system shown in FIG. 1, by using an example in which a unified orchestration function entity is an MEPM and an architecture manager is a VIM, the following describes a process of terminating an instance of an application by using the method shown in FIG. 6a or FIG. 6b.

Figure 6A:
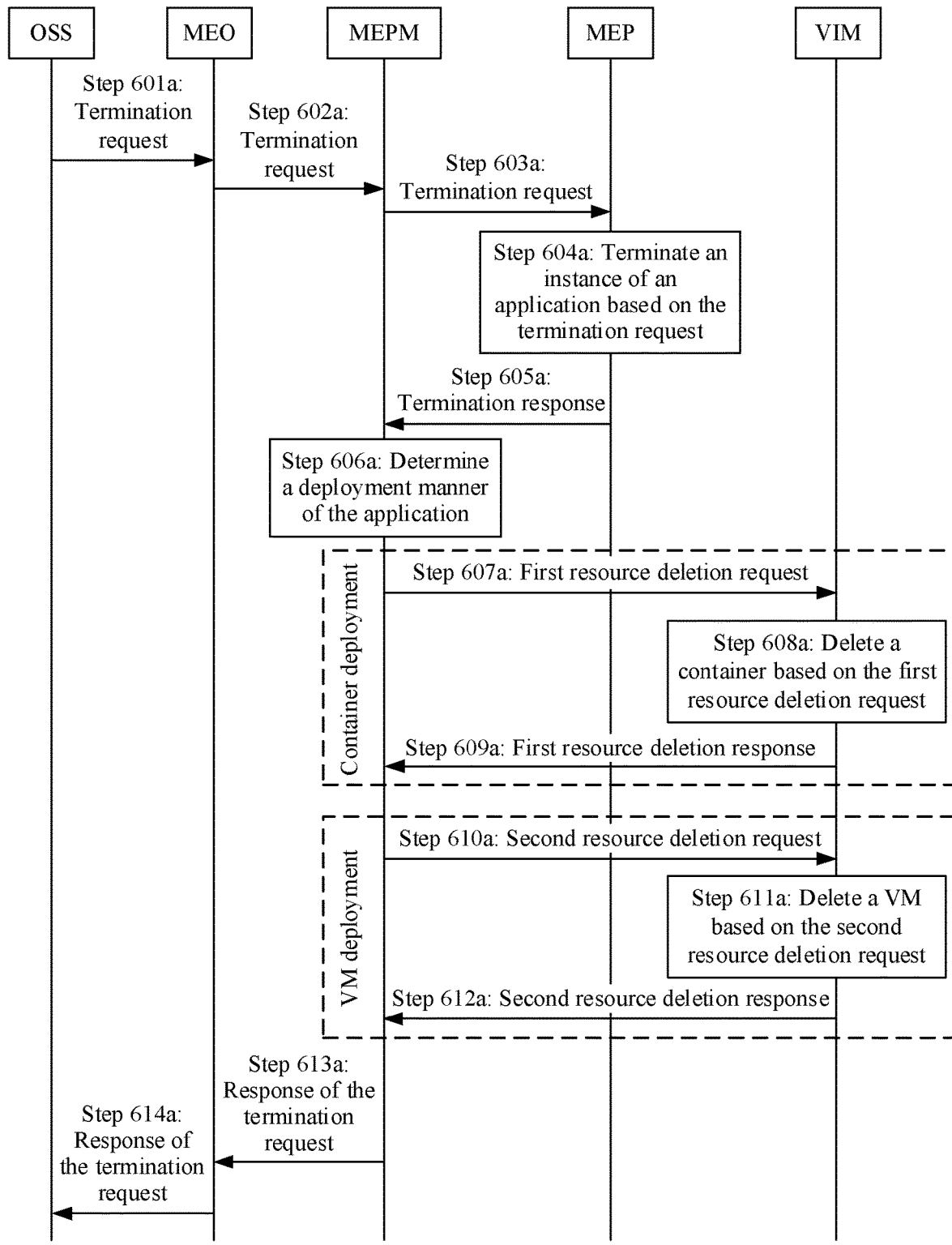
FIG. 6a is a flowchart of a method for terminating an instance of an application according to an embodiment of this application.

FIG. 6a is a flowchart of a method for terminating an instance of an application according to an embodiment of this application. As shown in FIG. 6a, the method may include following steps.

Step 601a: An OSS sends a termination request to a MEO.

For related description of the termination request, refer to step 401. Details are not described again.

Step 602a: The MEO receives the termination request, and sends the termination request to an MEPM.

Step 603a: The MEPM receives the termination request, and sends the termination request to an MEP.

Step 604a: The MEP receives the termination request, and terminates the instance of the application based on the termination request.

For step 604a, refer to the description of step 403. Details are not described again.

Step 605a: The MEP sends a termination response to the MEPM.

For related description of the termination response and an execution process of step 605a, refer to step 404. Details are not described again.

Step 606a: The MEPM determines a deployment manner of the application; and if the deployment manner of the application is container deployment, step 607a to step 609a are performed; or if the deployment manner of the application is VM deployment, step 610a to step 612a are performed.

For step 606a, refer to the description of step 405. Details are not described again.

Step 607a: The MEPM sends a first resource deletion request to a VIM.

For related description of the first resource deletion request and an execution process of step 607a, refer to step 406. Details are not described again.

Step 608a: The VIM receives the first resource deletion request, and deletes a container based on the first resource deletion request.

For step 608a, refer to the description of step 407. Details are not described again.

Step 609a: The VIM sends a first resource deletion response to the MEPM, and the MEPM receives the first resource deletion response.

For step 609a, refer to the description of step 408. Details are not described again.

Step 610a: The MEPM sends a second resource deletion request to the VIM.

For related description of the second resource deletion request and an execution process of step 610a, refer to step 409. Details are not described again.

Step 611a: The VIM receives the second resource deletion request, and deletes a VM based on the second resource deletion request.

For step 611a, refer to the description of step 410. Details are not described again.

Step 612a: The VIM sends a second resource deletion response to the MEPM, and the MEPM receives the second resource deletion response.

For step 612a, refer to the description of step 411. Details are not described again.

Step 613a: The MEPM sends a response of the termination request to the MEO.

Step 614a: The MEO receives the response of the termination request, and sends the response of the termination request to the OSS.

Based on method shown in FIG. 6a, after a termination request for terminating the instance of the application is received, corresponding termination processing based on the deployment manner of the application may be performed. For example, if the deployment manner is the container deployment, the first resource deletion request is sent to the VIM, to request the VIM to delete container resources occupied by the instance of the application; or if the deployment manner is the VM deployment, the second resource deletion request is sent to the VIM, to request the VIM to delete VM resources occupied by the instance of the application. In this way, in a case in which the instance of the application is not required, an architecture manager or the VIM may be requested to delete the instance of the application.

With reference to the MEC system shown in FIG. 2, by using an example in which a unified orchestration function entity is an MEPM and an architecture manager is a CIM, the following describes a process of terminating an instance of an application.

Figure 6B:
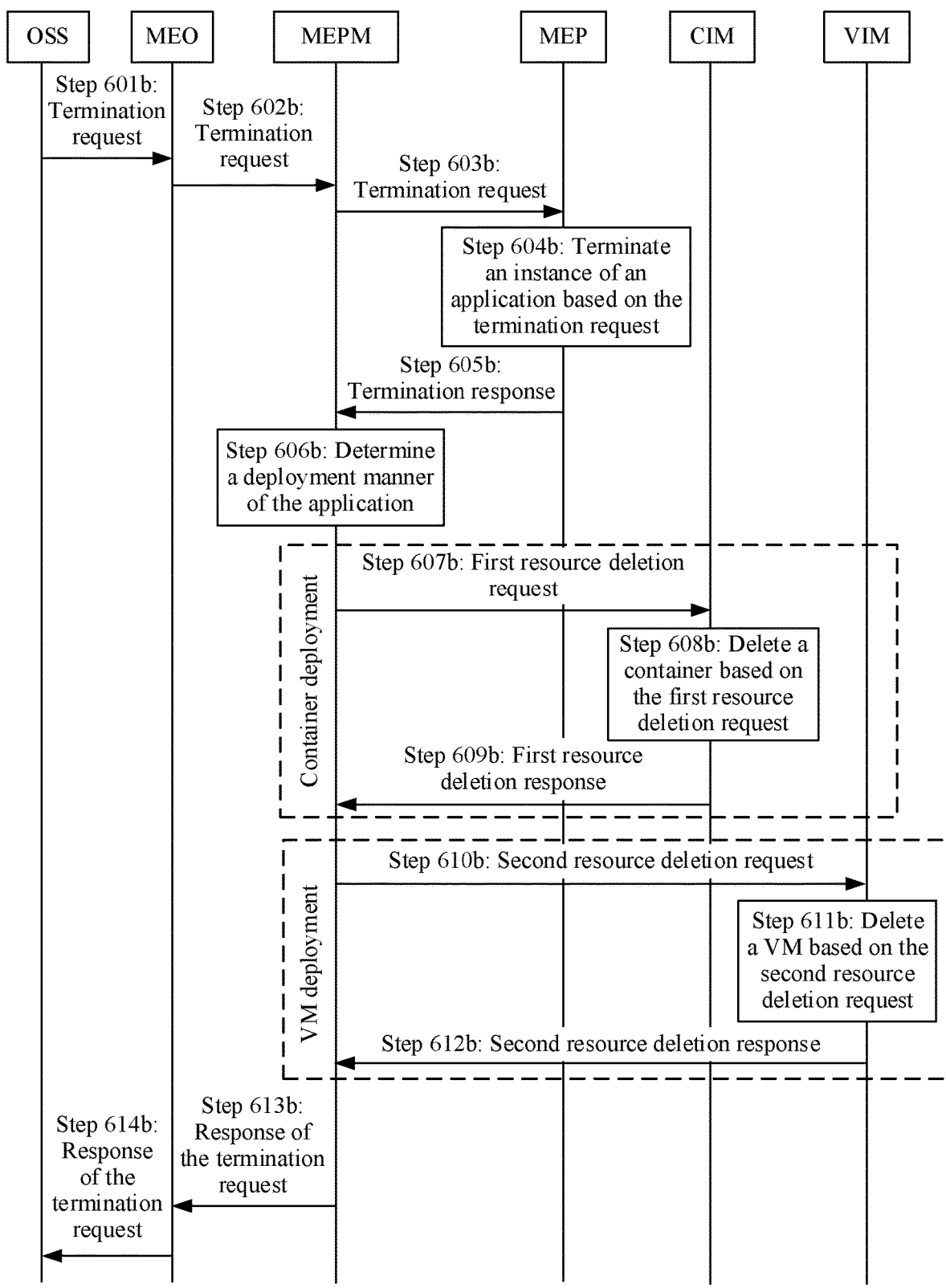
FIG. 6b is a flowchart of another method for terminating an instance of an application according to an embodiment of this application.

FIG. 6b is a flowchart of another method for terminating an instance of an application according to an embodiment of this application. As shown in FIG. 6b, the method may include following steps.

Step 601b: An OSS sends a termination request to a MEO.

For related description of the termination request, refer to step 401. Details are not described again.

Step 602b: The MEO receives the termination request, and sends the termination request to an MEPM.

Step 603b: The MEPM receives the termination request, and sends the termination request to an MEP.

Step 604b: The MEP receives the termination request, and terminates the instance of the application based on the termination request.

For step 604b, refer to the description of step 403. Details are not described again.

Step 605b: The MEP sends a termination response to the MEPM.

For related description of the termination response and an execution process of step 605b, refer to step 404. Details are not described again.

Step 606b: The MEPM receives the termination request, and determines a deployment manner of the application; and if the deployment manner of the application is container deployment, step 607b to step 609b are performed; or if the deployment manner of the application is VM deployment, step 610b to step 612b are performed.

For step 606b, refer to the description of step 405. Details are not described again.

Step 607b: The MEPM sends a first resource deletion request to a CIM.

For related description of the first resource deletion request and an execution process of step 607b, refer to step 406. Details are not described again.

Step 608b: The CIM receives the first resource deletion request, and deletes a container based on the first resource deletion request.

For step 608b, refer to the description of step 407. Details are not described again.

Step 609b: The CIM sends a first resource deletion response to the MEPM, and the MEPM receives the first resource deletion response.

For step 609b, refer to the description of step 408. Details are not described again.

Step 610b: The MEPM sends a second resource deletion request to a VIM.

For related description of the second resource deletion request and an execution process of step 610b, refer to step 409. Details are not described again.

Step 611b: The VIM receives the second resource deletion request, and deletes a VM based on the second resource deletion request.

For step 611b, refer to the description of step 410. Details are not described again.

Step 612b: The VIM sends a second resource deletion response to the MEPM, and the MEPM receives the second resource deletion response.

For step 612b, refer to the description of step 411. Details are not described again.

Step 613b: The MEPM sends a response of the termination request to the MEO.

Step 614b: The MEO receives the response of the termination request, and sends the response of the termination request to the OSS.

Based on method shown in FIG. 6b, after a termination request for terminating the instance of the application is received, corresponding termination processing based on the deployment manner of the application may be performed. For example, if the deployment manner is the container deployment, the first resource deletion request is sent to the CIM, to request the CIM to delete container resources occupied by the instance of the application; or if the deployment manner is the VM deployment, the second resource deletion request is sent to the VIM, to request the VIM to delete VM resources occupied by the instance of the application. In this way, in a case in which the instance of the application is not required, an architecture manager or the VIM may be requested to delete the instance of the application.

Figure 7A:
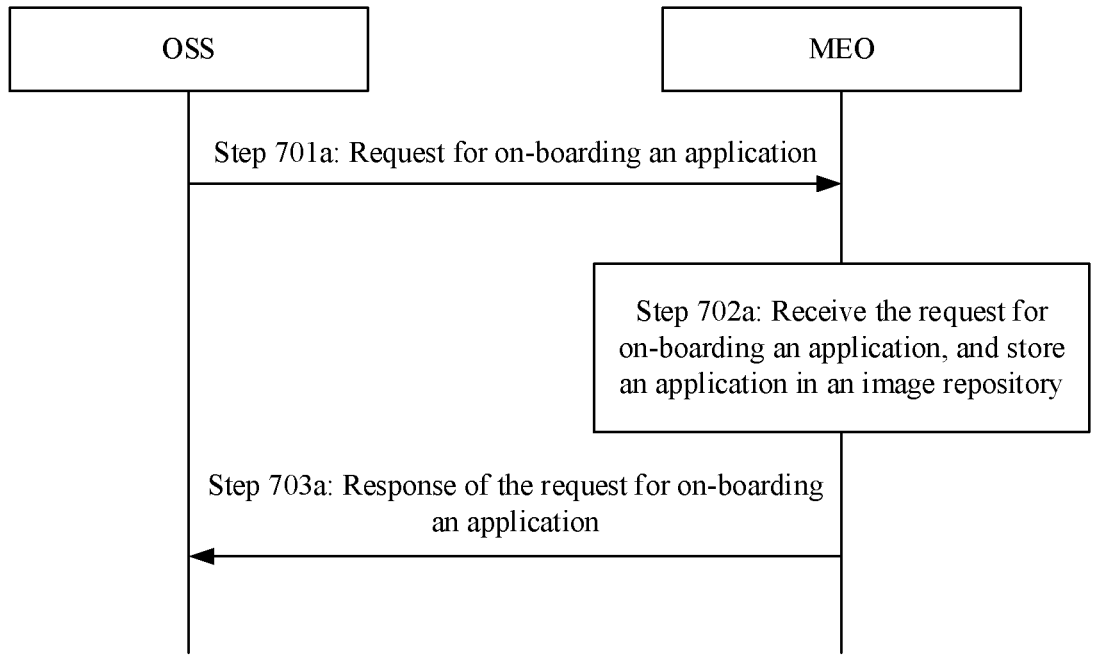
FIG. 7a is a flowchart of a method for on-boarding an application according to an embodiment of this application.

In the methods shown in FIG. 3 to FIG. 6b, a container image repository may store a container image file, and the container image file may store an application in the container deployment. Similarly, a VM image repository may store a VM image file, the VM image file may store an application in the VM deployment. The container image repository and the VM image repository may include one or more applications, and each application may be uniquely identified by an ID of the application. For example, an application may be stored in an image repository (the container image repository or the VM image repository) through an on-boarding (on-boarding) process. Specifically, as shown in FIG. 7a, the process may include following steps.

Step 701a: An OSS sends a request for on-boarding an application to a MEO.

The request for on-boarding an application may be used to request to on-board the application to a MEC system. The request for on-boarding an application may include an ID and a deployment type identifier of the application. The deployment type identifier may be used to identify that the application is an application in container deployment or an application in VM deployment.

It should be noted that when the application is the application in container deployment, the request for on-boarding an application may further include a container image address. When the application is the application in VM deployment, the request for on-boarding an application may further include a VM image address. This is not limited in this embodiment of this application.

For example, the OSS may receive a request for on-boarding an application sent by a CFS portal or a user app LCM proxy, and forward the received request for on-boarding an application to the MEO.

Step 702a: The MEO receives the request for on-boarding an application, and saves the application to the image repository.

For example, the image repository may be deployed in the MEO or the MEPM, which is not limited. The image repository may include the container image repository and the VM image repository. If the deployment type identifier is used to identify that the application is a container image, the application is stored in the container image repository; or if the deployment type identifier is used to identify that the application is a VM application, the application is stored in the VM image repository.

In addition, the MEO may allocate an ID to each application, to uniquely identify the application, and may further allocate status information related to each application, for example, may allocate a status of the application as available or unavailable.

Step 703a: The MEO sends a response of the request for on-boarding an application to the OSS.

The response of the request for on-boarding an application may be used to indicate that the application is successfully on-boarded (or saved) into the MEC system. The response of the request for on-boarding an application is corresponding to the request for on-boarding an application in step 701a, and may include but is not limited to information such as the ID of the application.

In the method shown in FIG. 7a, to prevent a malicious application attack, an application included in the request for on-boarding an application may include a mandatory element. After receiving the request for on-boarding an application, the MEO may check whether the mandatory element included in the application is the same as an agreed element. If the mandatory element is the same, it indicates that the application has integrity and authenticity and can be saved in the MEC system. On the contrary, if the mandatory element included in the application is different from the agreed element, it indicates that the application is tampered with, and the application cannot be saved in the MEC system, and the application fails to be on-boarded.

The agreed element may be an element that is predetermined between the OSS and the MEO and that can be used to verify authenticity and integrity of the application.

In this way, the application may be on-boarded into the MEC system, and the application is available in the MEC system and instantiation deployment may be performed.

In the methods shown in FIG. 3 to FIG. 6b, the MEO may query, disable, enable, delete the on-boarded application. Specifically, for a process of querying an application, refer to FIG. 7b, for a process of disabling an application, refer to FIG. 7c, for a process of enabling an application, refer to FIG. 7d, and for a process of deleting an application, refer to FIG. 7e.

Figure 7B:
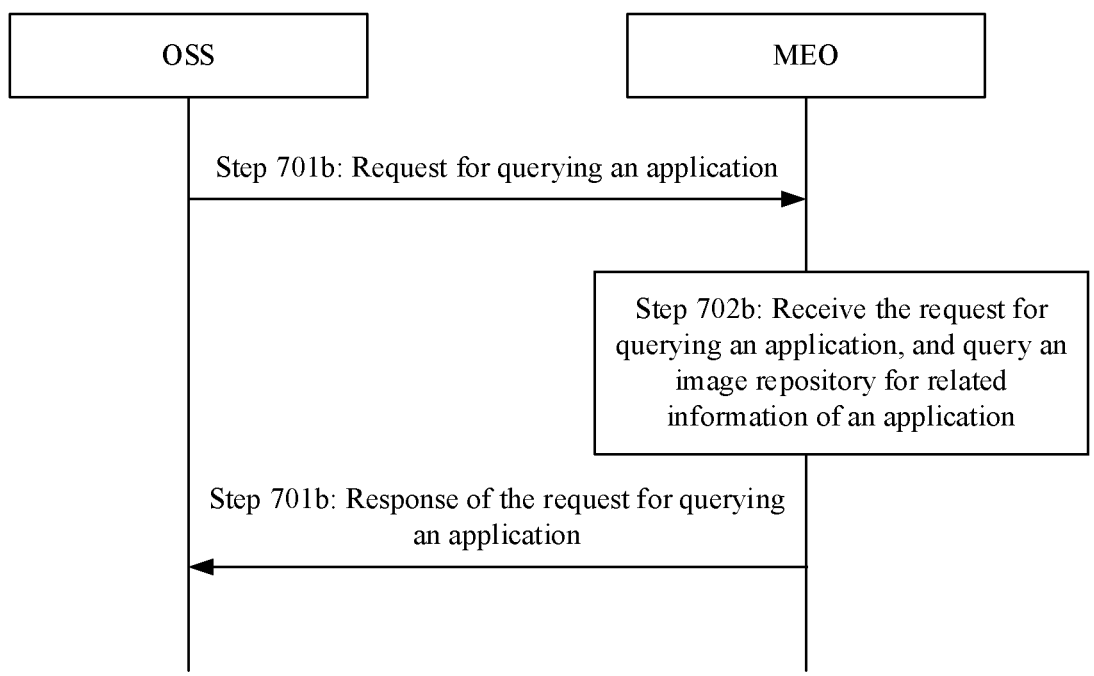
FIG. 7b is a flowchart of a method for querying an application according to an embodiment of this application.

FIG. 7b is a flowchart of a method for querying an application according to an embodiment of this application. As shown in FIG. 7b, the method may include following steps.

Step 701b: An OSS sends a request for querying an application to a MEO.

The request for querying an application may be used to request to query related information of the application, for example, a rule and a requirement of the application. The request for querying an application may include an ID of the application, and may further include other information such as a filter condition. This is not limited.

For example, the OSS may receive a request for querying an application sent by a CFS portal or a user app LCM proxy, and forward the received request for querying an application to the MEO.

Step 702b: The MEO receives the request for querying an application, and queries an image repository for the related information of the application.

For example, if a bearing form of the application is a container image, the MEO queries a container image repository for the related information of the application; or if the application is a VM application, the MEO queries a VM image repository for the related information of the application.

Step 703b: The MEO sends a response of the request for querying an application to the OSS.

The response of the request for querying an application may include the related information of the application, for example, the rule and the requirement of the application. For example, the MEO may add, to the response, the related information of the application that meets the filter condition, and send the response to the OSS.

In this way, the related information of the application may be queried by using the query process shown in FIG. 7b.

Figure 7C:
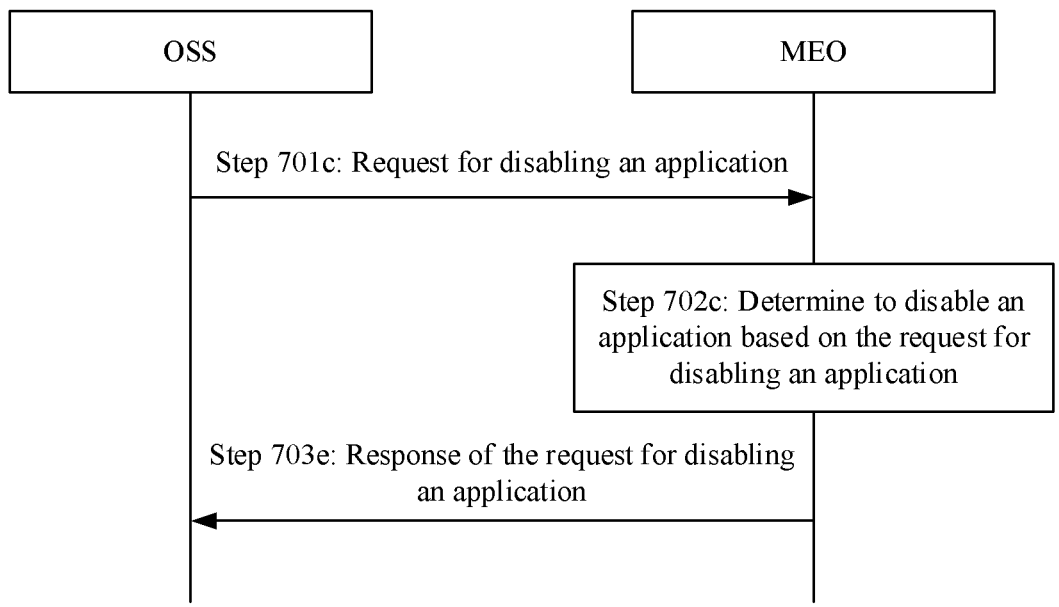
FIG. 7c is a flowchart of a method for enabling an application according to an embodiment of this application.

FIG. 7c is a flowchart of a method for disabling an application according to an embodiment of this application. As shown in FIG. 7c, the method may include following steps.

Step 701c: An OSS sends a request for disabling an application to a MEO.

The request for disabling an application may be used to request to disable the application, so that the application is unavailable. The request for disabling an application may include an ID of the application, and the like, which is not limited.

For example, the OSS may receive a request for disabling an application sent by a CFS portal or a user app LCM proxy, and forward the received request for disabling an application to the MEO.

Step 702c: The MEO receives the request for disabling an application, and determines to disable the application based on the request for disabling an application.

For example, the MEO may first check, based on the ID of the application included in the request for disabling an application, whether an application identified by the ID of the application exists, and if the application exists, check whether a status of the application is enabled; and if the application is enabled, the MEO marks the application as disabled.

Step 703c: The MEO sends a response of request for disabling an application to the OSS.

The response of the request for disabling an application may be used to indicate that the application is disabled in a MEC system.

In this way, an application existing in the MEC system may be disabled by using the procedure shown in FIG. 7c.

Figure 7D:
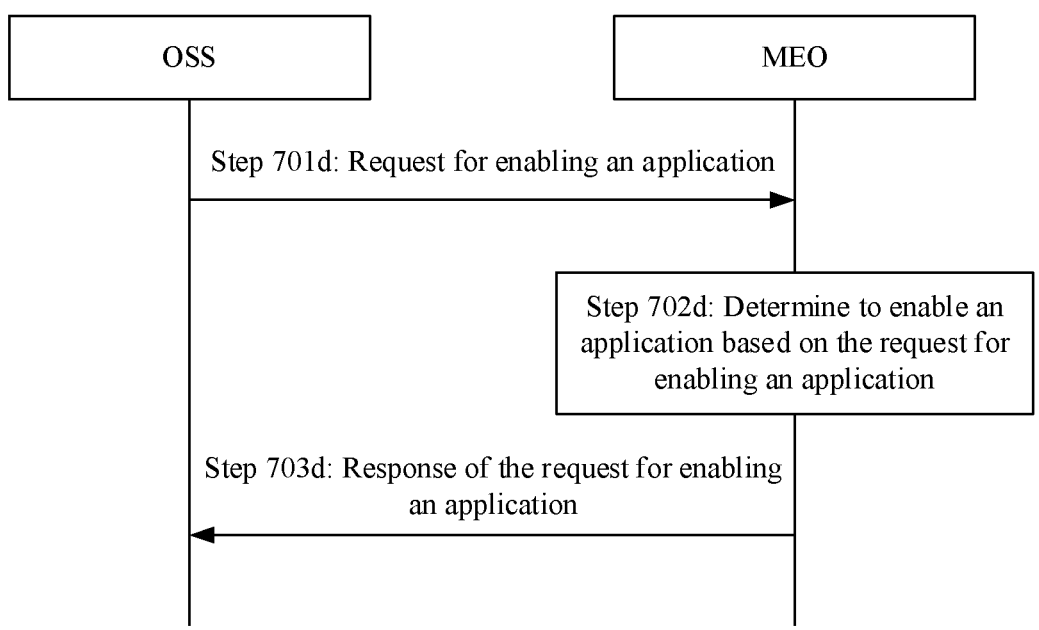
FIG. 7d is a flowchart of a method for disabling an application according to an embodiment of this application.

FIG. 7d is a flowchart of a method for enabling an application according to an embodiment of this application. As shown in FIG. 7d, the method may include following steps.

Step 701d: An OSS sends a request for enabling an application to a MEO.

The request for enabling an application may be used to request to enable the application, so that the application is available in a MEC system. The request for enabling an application may include an ID of the application, and the like, which is not limited.

For example, the OSS may receive a request for enabling an application sent by a CFS portal or a user app LCM proxy, and forward the received request for enabling an application to the MEO.

Step 702d: The MEO receives the request for enabling an application, and determines to enable the application based on the request for enabling an application.

For example, the MEO may first check, based on the ID of the application included in the request for enabling an application, whether an application identified by the ID of the application exists; if the application exists, check whether the application is marked as disabled and is not marked as deleted and to-be-processed; and if the application is marked as disabled and is not marked as deleted and to-be-processed, enable the application.

Step 703d: The MEO sends a response of request for enabling an application to the OSS.

The response of the request for enabling an application may be used to indicate that the application is enabled in a MEO system.

In this way, an application existing in the MEO system may be enabled by using the procedure shown in FIG. 7d.

Figure 7E:
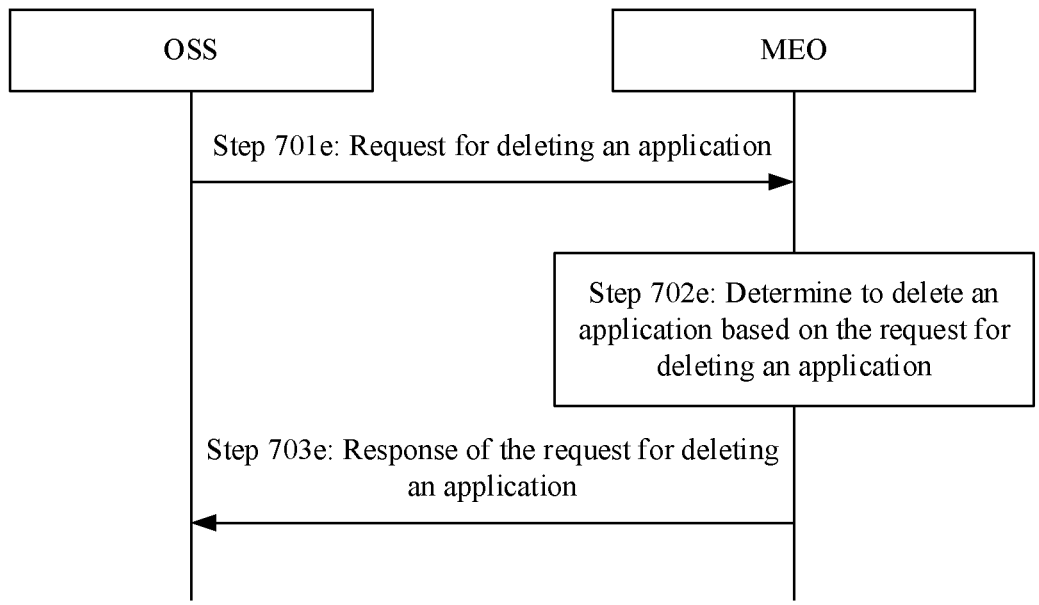
FIG. 7e is a flowchart of a method for deleting an application according to an embodiment of this application.

FIG. 7e is a flowchart of a method for deleting an application according to an embodiment of this application. As shown in FIG. 7e, the method may include following steps.

Step 701e: An OSS sends a request for deleting an application to a MEO.

The request for deleting an application may be used to request to delete the application, so that the application is available in a MEC system. The request for deleting an application may include an ID of the application and a deployment type identifier (a VM or a container) of the application, or may include other information. This is not limited.

For example, the OSS may receive request for deleting an application sent by a CFS portal or a user app LCM proxy, and forward the received application deletion request to the MEO.

Step 702e: The MEO receives the request for deleting an application, and determines to delete the application based on the request for deleting an application.

For example, the MEO may first check, based on the ID of the application included in the request for deleting an application, whether an application identified by the ID of the application is disabled and whether the disabled application is in use. If the application is disabled but in use, the MEO sets a status of the application as deletion suspension. If the application is disabled and not in use, the MEO deletes the application from a mobile edge system.

Specifically, the MEO may determine, based on the deployment type identifier (VM deployment or container deployment) included in the request for deleting an application, whether an application that is requested to be deleted is a VM application or a container image. If the application that is requested to be deleted is a VM application, the MEO and a file server that stores the VM application interactively delete the application. If the application is a container image, the MEO needs to access a container image repository and invoke a container engine command to delete the corresponding container image. If the application is in a deletion suspension status, the MEO may check all instances corresponding to the application, and delete the application after the instances of the application is terminated. If there is no instance of the application in use, the MEO may delete the application.

Step 703e: The MEO sends a response of the request for deleting an application to the OSS.

The response of the request for deleting an application may be used to indicate that the application is deleted in a MEO system.

In this way, an application existing in the MEO system may be deleted by using the procedure shown in FIG. 7e.

The foregoing mainly describes the solutions provided in the embodiments of this application from a perspective of interaction between function entities in the MEC system. It should be understood that, to implement the foregoing functions, each function entity, for example, a unified orchestration function entity (an MEPM or a MEO) or a VIM, includes a corresponding hardware structure and/or software module for performing each function. A person of ordinary skill in the art should easily be aware that, in combination with the examples described in the embodiments disclosed in this specification, algorithm steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this disclosure, the MEPM may be divided into functional modules based on the foregoing method examples. For example, each functional module may be obtained through division based on each corresponding function, or two or more functions may be integrated into one processing module. The integrated module may be implemented in a form of hardware, or may be implemented in a form of a software functional module. It should be noted that, in this embodiment of this application, module division is an example, and is merely a logical function division. In actual implementation, another division manner may be used.

Figure 8:
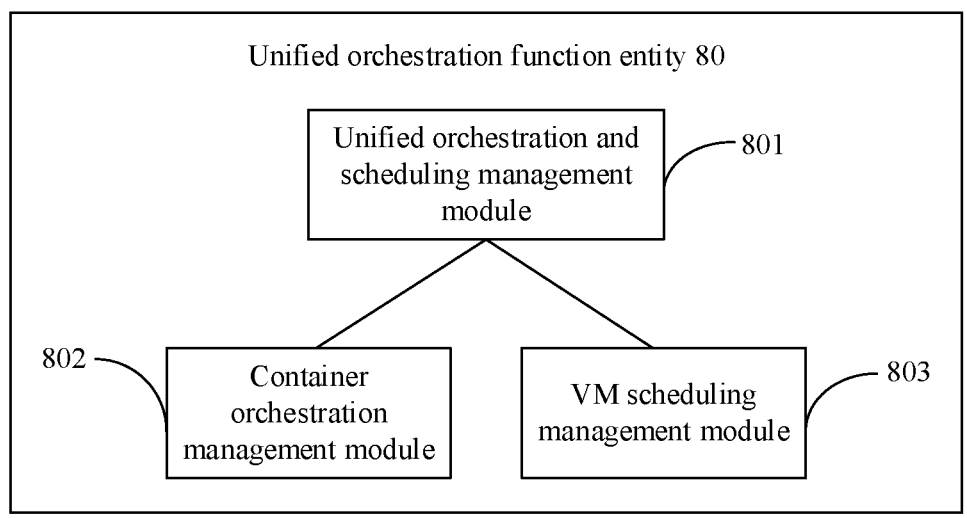
FIG. 8 is a schematic composition diagram of a unified orchestration function entity according to an embodiment of this application.

FIG. 8 shows a structural diagram of a unified orchestration function entity 80. The unified orchestration function entity 80 may be a MEO, a chip in a MEO, or a system on a chip in a MEO, or may be an MEPM, a chip in an MEPM, or a system on a chip in an MEPM. The unified orchestration function entity 80 may be configured to perform a function of the unified orchestration function entity in the foregoing embodiments. In an implementation, the unified orchestration function entity 80 shown in FIG. 8 includes:

a unified orchestration and scheduling management module 801, configured to: receive a deployment request, and determine a deployment manner of an application based on the deployment request, where the deployment request is used to request to deploy an instance of the application, the deployment request includes an identifier ID and orchestration information of the application, the orchestration information is used to indicate resources required for deploying the instance of the application, and the deployment manner of the application includes container deployment or virtual machine VM deployment. For example, the unified orchestration and scheduling management module 801 may support the unified orchestration function entity 80 in performing step 301, step 302, and the like.

Further, as shown in FIG. 8, the unified orchestration function entity 80 may include: a container orchestration management module 802, configured to: if the unified orchestration and scheduling management module 801 determines that the deployment manner of the application is the container deployment, send a first resource allocation request to an architecture manager, where the first resource allocation request is used to request resources required for deploying a container that can run the instance of the application. For example, the container orchestration management module 802 may support the unified orchestration function entity 80 in performing step 303 and the like.

AVM scheduling management module 803 is configured to: if the unified orchestration and scheduling management module 801 determines that the deployment manner of the application is the VM deployment, send a second resource allocation request to a VIM, where the second resource allocation request is used to request resources required for deploying a VM that can run the instance of the application. For example, the VM scheduling management module 803 may support the unified orchestration function entity 80 in performing step 306 and the like.

The architecture manager may be a VIM, a CIM, or the like. This is not limited.

It should be noted that all related content of the steps in the foregoing method embodiments may be cited in function description of corresponding functional modules. Details are not described herein again. The unified orchestration function entity 80 provided in this embodiment of this application is configured to perform functions of the unified orchestration function entity 80 in the foregoing method for deploying a virtual machine and a container. Therefore, an effect the same as that in the foregoing method for deploying a virtual machine and a container can be achieved.

In addition, it should be noted that deployment locations of components included in the unified orchestration function entity 80 are not limited in this embodiment of this application. The components included in the unified orchestration function entity 80 may be centrally deployed in the MEO or the MEPM, or may be separately deployed in different function entities. For example, the unified orchestration and scheduling management module 801 may be deployed in the MEO, and the container orchestration management module 802 and the VM scheduling management module 803 may be deployed in the MEPM. This is not limited.

In another implementation, the unified orchestration function entity 80 shown in FIG. 8 may include a processing module and a communications module. The unified orchestration and scheduling management module 801, the container orchestration management module 802, and the VM scheduling management module 803 may be integrated into the processing module. The processing module is configured to control and manage information received by the communications module. For example, the processing module is configured to support the unified orchestration function entity 80 in performing step 301, step 302, step 303, step 306, and another process of performing the technology described in this specification. The communications module is configured to support the unified orchestration function entity 80 in receiving a deployment request and communicating with another network entity, for example, communicating with the function module or the network entity shown in FIG. 1. Further, the unified orchestration function entity 80 may further include a storage module, configured to store program code and data of the unified orchestration function entity 80.

The processing module may be a processor, for example, a central processing unit (central processing unit, CPU), a general-purpose processor, a network processor (network processor, NP), a digital signal processor (digital signal processor, DSP), a microprocessor, a microcontroller, a programmable logic device (programmable logic device, PLD), or any combination thereof. The processor may alternatively be any other apparatus having a processing function, for example, a circuit, a component, or a software module.

The communications module may be a communications interface for communicating with another device or a communications network (for example, the Ethernet, and a radio access network (RAN)) The communications interface may be, for example, a module, a circuit, a transceiver, or any apparatus that can implement communication.

Figure 9:
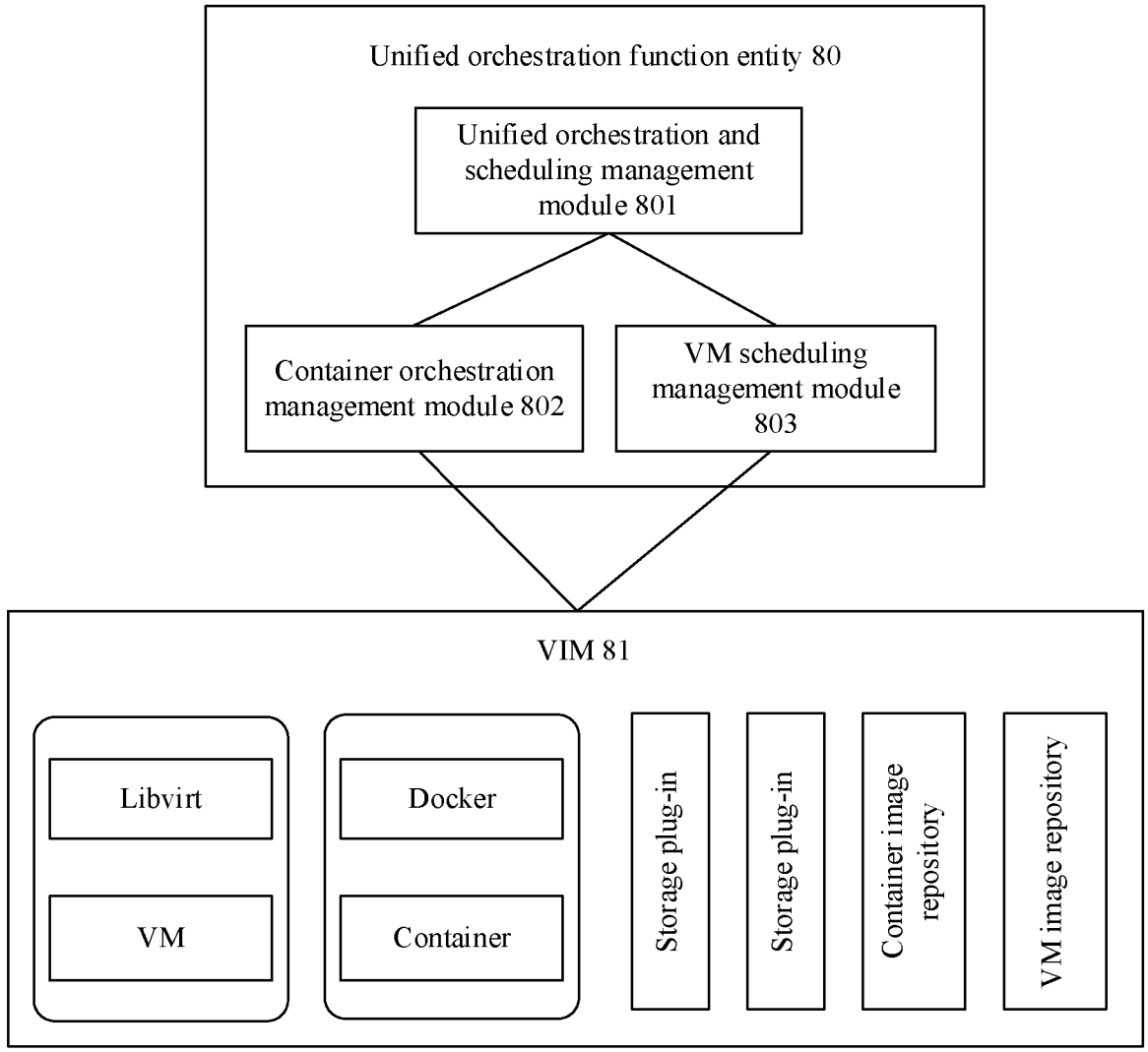
FIG. 9 is a schematic composition diagram of a MEC system according to an embodiment of this application.

The memory may be a read-only memory (ROM) or another type of static storage device that can store static information and instructions, a random access memory (RAM) or another type of dynamic storage device that can store information and instructions, or may be an electrically erasable programmable read-only memory (EEPROM), a compact disc read-only memory (CD-ROM) or another compact disc storage medium, an optical disc storage medium (including a compact disc, a laser disc, an optical disc, a digital versatile disc, a Blu-ray disc, or the like), a magnetic disk storage medium or another magnetic storage device, or any other medium that can be used to carry or store expected program code in a form of instructions or a data structure and that can be accessed by a computer. However, the memory is not limited thereto. In a possible design, the memory may be independent of the processor. To be specific, the memory may be a memory outside the processor. In this case, the memory may be connected to the processor by using a communications line, and is configured to store instructions or program code. When invoking and executing the instructions or the program code stored in the memory, the processor can implement the method for deploying a virtual machine and a container provided in the following embodiments of this application. In another possible design, the memory may alternatively be integrated with the processor. To be specific, the memory may be an internal memory of the processor. For example, the memory is a cache, and may be configured to temporarily store some data, instruction information, and/or the like. FIG. 9 is an architectural diagram of a MEC system according to an embodiment of this application. As shown in FIG. 9, the system may include a unified orchestration function entity 80 and a VIM 81. The unified orchestration function entity 80 and the function entity shown in FIG. 8 include a same component and have a same function. The unified orchestration function entity may be the MEPM or the MEO shown in FIG. 1 or FIG. 2.

The unified orchestration function entity 80 is configured to: receive a deployment request, and determine a deployment manner of an application based on the deployment request, where the deployment request is used to request to deploy an instance of the application, the deployment request includes an identifier ID and orchestration information of the application, the orchestration information is used to indicate resources required for deploying the instance of the application, and the deployment manner of the application includes container deployment or virtual machine VM deployment.

The unified orchestration function entity 80 is further configured to: if the deployment manner of the application is the container deployment, send a first resource allocation request to the VIM 81, where the first resource allocation request is used to request resources required for deploying a container that can run the instance of the application; or if the deployment manner of the application is the VM deployment, send a second resource allocation request to the VIM 81, where the second resource allocation request is used to request resources required for deploying a VM that can run the instance of the application.

The VIM 81 is configured to receive the first resource allocation request, and deploy, based on the first resource allocation request, the container that is able to run the instance of the application, or is configured to receive the second resource allocation request, and deploy, based on the second resource allocation request, the virtual machine that is able to run the application.

It should be noted that, for a specific implementation method of each function entity in the foregoing system architecture, refer to all related content of the steps in the foregoing method embodiments. Details are not described herein again.

Based on the system according to FIG. 9, after receiving an application deployment request, the MEPM or the MEO may analyze the received application deployment request, and determine a deployment manner (the container deployment or the VM deployment) of an application requested to be deployed; and if the deployment manner is the container deployment, send a resource allocation request to the CIM, and request resources required for deploying the application in the container deployment manner, to complete container deployment of the application; or if the deployment manner is the VM deployment, send a resource allocation request is sent to the VIM, and request resources required for deploying the application in the VM deployment manner, to complete VM deployment of the application. In this way, both the VM deployment and the container deployment may be implemented in the MEC system.

Figure 10:
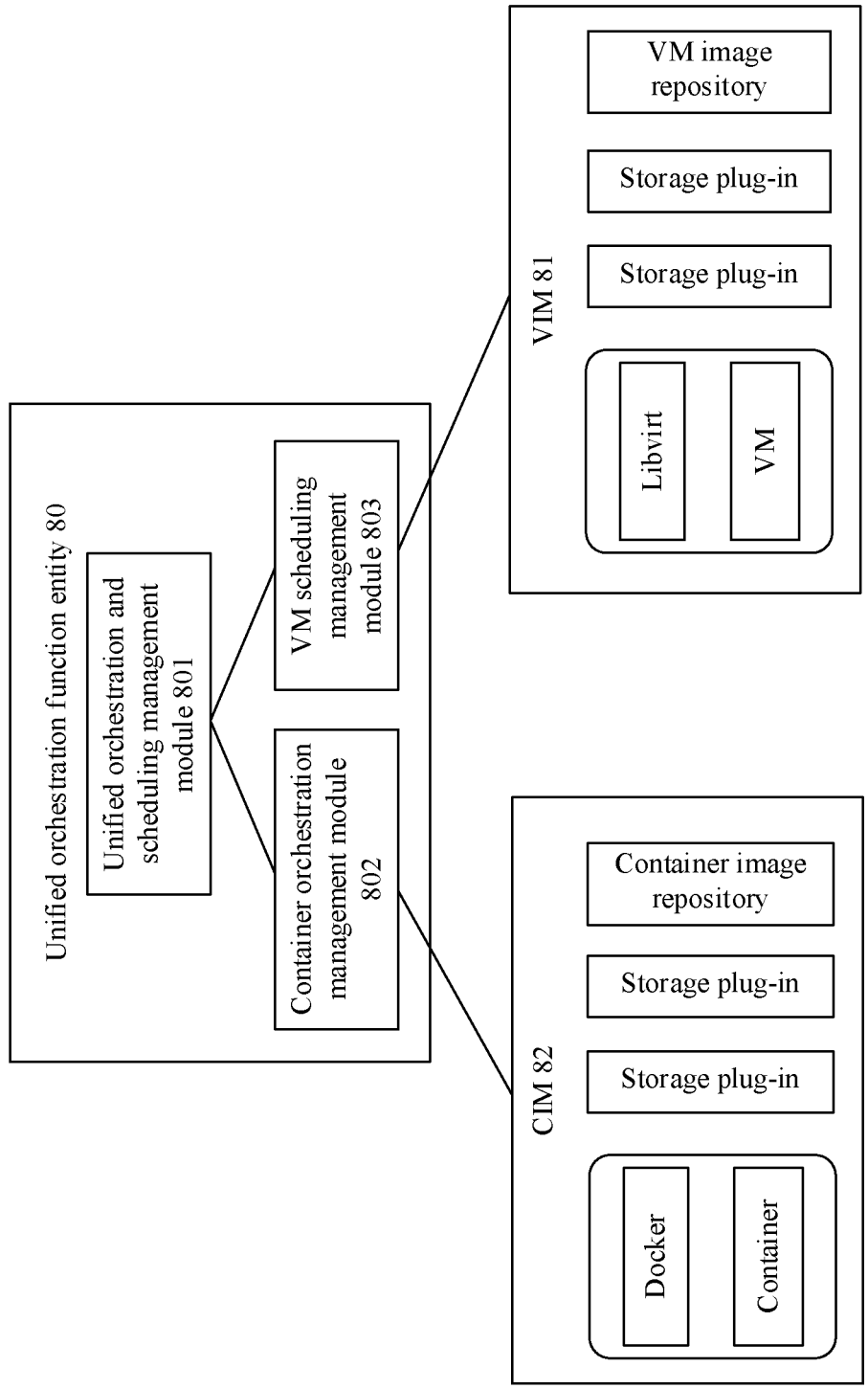
FIG. 10 is a schematic composition diagram of another MEC system according to an embodiment of this application.

FIG. 10 is an architectural diagram of another MEC system according to an embodiment of this application. As shown in FIG. 10, the system may include a unified orchestration function entity 80, a VIM 81 and a CIM 82. The unified orchestration function entity 80 and the function entity shown in FIG. 8 include a same component and have a same function. The unified orchestration function entity may be the MEPM or the MEO shown in FIG. 1 or FIG. 2.

The unified orchestration and scheduling management module 80 is configured to: receive a deployment request, and determine a deployment manner of an application based on the deployment request, where the deployment request is used to request to deploy an instance of the application, the deployment request includes an identifier ID and orchestration information of the application, the orchestration information is used to indicate resources required for deploying the instance of the application, and the deployment manner of the application includes container deployment or virtual machine VM deployment.

The unified orchestration function entity 80 is further configured to: if the deployment manner of the application is the container deployment, send a first resource allocation request to the VIM 81, where the first resource allocation request is used to request resources required for deploying a container that can run the instance of the application. Alternatively, if the deployment manner of the application is the VM deployment, the unified orchestration function entity 80 sends a second resource allocation request to the CIM 82, where the second resource allocation request is used to request resources required for deploying a VM that can run the instance of the application.

The VIM 81 is configured to: receive the first resource allocation request, and deploy, based on the first resource allocation request, a container that can run the instance of the application.

The CIM 82 is configured to: receive the second resource allocation request, and deploy, based on the second resource allocation request, the VM that can run the instance of the application.

It should be noted that, for a specific implementation method of each function entity in the foregoing system architecture, refer to all related content of the steps in the foregoing method embodiments. Details are not described herein again.

Based on the system according to FIG. 10, after receiving an application deployment request, the MEPM or the MEO may analyze the received application deployment request, and determine a deployment manner (the container deployment or the VM deployment) of an application requested to be deployed; and if the deployment manner is the container deployment, send a resource allocation request to the CIM, and request resources required for deploying the application in the container deployment manner, to complete container deployment of the application; or if the deployment manner is the VM deployment, send a resource allocation request is sent to the VIM, and request resources required for deploying the application in the VM deployment manner, to complete VM deployment of the application. In this way, both the VM deployment and the container deployment may be implemented in the MEC system.

The foregoing description about implementations allows a person skilled in the art to understand that, for the purpose of convenient and brief description, division of the foregoing function modules is taken as an example for illustration. In actual application, the foregoing functions can be allocated to different modules and implemented according to a requirement, that is, an inner structure of an apparatus is divided into different function modules to implement all or some of the functions described above.

In the several embodiments provided in this application/disclosure, it should be understood that the disclosed apparatus and method may be implemented in other manners. For example, the described apparatus embodiment is merely an example. For example, the module or unit division is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of this application essentially, or the part contributing to the prior art, or all or some of the technical solutions may be implemented in the form of a software product. The software product is stored in a storage medium and includes several instructions for instructing a device (which may be a single-chip microcomputer, a chip or the like) or a processor (processor) to perform all or some of the steps of the methods described in the embodiments of this application. The foregoing storage medium includes: any medium that can store program code, such as a USB flash drive, a removable hard disk, a ROM, a RAM, a magnetic disk, or an optical disc.

The foregoing description is merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method for deploying an application, wherein the method comprises:
    receiving a deployment request, wherein the deployment request is used to request to deploy an instance of an application, the deployment request comprises an identifier (ID) and orchestration information of the application, and the orchestration information is used to indicate resources required for running the instance of the application;
    determining a deployment manner of the application based on the deployment request, wherein the deployment manner of the application comprises container deployment or virtual machine (VM) deployment;
    sending a first resource allocation request to a container infrastructure manager (CIM) when the deployment manner of the application is the container deployment, wherein the first resource allocation request is used to request resources required for deploying a container capable of running the instance of the application; and
    sending a second resource allocation request to a virtualized infrastructure manager (VIM) when the deployment manner of the application is the VM deployment, wherein the second resource allocation request is used to request resources required for deploying a VM capable of running the instance of the application.

2. The method according to claim 1, wherein a correspondence exists between the ID of the application and the deployment manner of the application, and the determining a deployment manner of the application based on the deployment request comprises:
  determining the deployment manner of the application based on the ID of the application and the correspondence.

3. The method according to claim 1, wherein the deployment request further comprises a deployment type identifier, the deployment type identifier is used to identify the deployment manner of the application, and the determining a deployment manner of the application based on the deployment request comprises:
  determining the deployment manner of the application based on the deployment type identifier.

4. The method according to claim 1, wherein the method further comprises:
  sending a configuration request to a mobile edge platform (MEP), wherein the configuration request is used to request the MEP to configure a traffic rule and a domain name system (DNS) rule for running the instance of the application.

5. The method according to claim 1, wherein the method further comprises:
  receiving a termination request, wherein the termination request comprises the ID of the application, and the termination request is used to terminate the instance of the application; and
  sending a first resource deletion request to the architecture manager when the deployment manner of the application is the container deployment, wherein the first resource deletion request is used to request the architecture manager to delete resources occupied by the instance of the application; or
  sending a second resource deletion request to the VIM when the deployment manner of the application is the VM deployment, wherein the second resource deletion request is used to request the VIM to delete resources occupied by the instance of the application.

6. The method according to claim 1, wherein the method is performed by a unified orchestration function entity and the unified orchestration function entity is a mobile edge platform manager (MEPM) or a mobile edge orchestrator (MEO).

7. A unified orchestration function entity, wherein the unified orchestration function entity comprises a transceiver, a memory, and a processor, wherein
  the transceiver is configured to perform communication;
  the memory is configured to store a computer program; and
  the processor is configured to invoke the computer program from the memory and run the computer program to:
  receive a deployment request, and determine a deployment manner of an application based on the deployment request, wherein the deployment request is used to request to deploy an instance of the application, the deployment request comprises an identifier (ID) and orchestration information of the application, the orchestration information is used to indicate resources required for deploying the instance of the application, and the deployment manner of the application comprises container deployment or virtual machine (VM) deployment;
  send a first resource allocation request to a container infrastructure manager (CIM) when the deployment manner of the application is the container deployment, wherein the first resource allocation request is used to request resources required for a container capable of running the instance of the application; and
  send a second resource allocation request to a virtualized infrastructure manager (VIM) when the unified orchestration and scheduling management module determines that the deployment manner of the application is the VM deployment, wherein the second resource allocation request is used to request resources required for deploying a VM capable of running the instance of the application.

8. The unified orchestration function entity according to claim 7, wherein a correspondence exists between the ID of the application and the deployment manner of the application, and the processor is further configured to invoke the computer program from the memory and run the computer program to:
  determine the deployment manner of the application based on the ID of the application and the correspondence.

9. The unified orchestration function entity according to claim 7, wherein the deployment request further comprises a deployment type identifier, the deployment type identifier is used to identify the deployment manner of the application, and the processor is further configured to invoke the computer program from the memory and run the computer program to determine the deployment manner of the application based on the deployment type identifier.

10. The unified orchestration function entity according to claim 7, wherein the processor is further configured to invoke the computer program from the memory and run the computer program to send a configuration request to a mobile edge platform (MEP), wherein the configuration request is used to request the MEP to configure a traffic rule and a domain name system (DNS) rule that are followed for running the instance of the application.

11. The unified orchestration function entity according to claim 7, wherein the processor is further configured to invoke the computer program from the memory and run the computer program to:
  receive a termination request, wherein the termination request comprises the ID of the application, and the termination request is used to terminate the instance of the application;
  send a first resource deletion request to the architecture manager when the deployment manner of the application is the container deployment, wherein the first resource deletion request is used to request the architecture manager to delete resources occupied by the instance of the application; and
  send a second resource deletion request to the VIM when the deployment manner of the application is the VM deployment, wherein the second resource deletion request is used to request the VIM to delete the resources occupied by the instance of the application.

12. The unified orchestration function entity according to claim 7, wherein the unified orchestration function entity is a mobile edge platform manager (MEPM) or a mobile edge orchestrator (MEO).

13. A multi-access edge computing (MEC) system, wherein the MEC system comprises a unified orchestration function entity and a container infrastructure manager (CIM);
  the unified orchestration function entity comprises a transceiver, a memory, and a processor, wherein the transceiver is configured to perform communication; the memory is configured to store a computer program; and the processor is configured to invoke the computer program from the memory and run the computer program to: receive a deployment request, and determine a deployment manner of an application based on the deployment request, wherein the deployment request is used to request to deploy an instance of the application, the deployment request comprises an identifier (ID) and orchestration information of the application, the orchestration information indicates resources required for deploying the instance of the application, and the deployment manner of the application comprises a container deployment or a virtual machine (VM) deployment;

when the deployment manner of the application is the container deployment, the processor of the unified orchestration function entity is further configured to invoke the computer program from the memory and run the computer program to send a first resource allocation request to the CIM when the deployment manner of the application is the container deployment, wherein the first resource allocation request is used to request resources required for deploying a container capable of running the instance of the application, and to send a second resource allocation request to a virtualized infrastructure manager (VIM) if the deployment manner of the application is the VM deployment, wherein the second resource allocation request is used to request resources required for deploying a VM capable of running the instance of the application; and the CIM comprises a transceiver, a memory, and a processor, wherein the transceiver is configured to perform communication; the memory is configured to store a computer program; and the processor is configured to invoke the computer program from the memory and run the computer program to: receive the first resource allocation request, and deploy, based on the first resource allocation request, the container capable of running the instance of the application.

14. The MEC system according to claim 13, wherein the unified orchestration function entity is a mobile edge platform manager (MEPM) or a mobile edge orchestrator (MEO).

* * * * *

UNITED STATES PATENT AND TRADEMARK OFFICE
CERTIFICATE OF CORRECTION

PATENT NO. : 12,393,436 B2
APPLICATION NO. : 17/481549
DATED : August 19, 2025
INVENTOR(S) : Xueliang Chen Page 1 of 1

It is certified that error appears in the above-identified patent and that said Letters Patent is hereby corrected as shown below:

On the Title Page

In Column 2, item (57) Abstract, Lines 7-8, delete "VM deployment" and insert -- VM deployment. --, therefor.

Signed and Sealed this
Twenty-third Day of December, 2025

John A. Squires
*Director of the United States Patent and Trademark Office*